US007461251B2

(12) United States Patent
Oishi

(10) Patent No.: US 7,461,251 B2
(45) Date of Patent: Dec. 2, 2008

(54) PUBLIC KEY CERTIFICATION ISSUING APPARATUS

(75) Inventor: Kazuomi Oishi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 744 days.

(21) Appl. No.: 10/419,776

(22) Filed: Apr. 22, 2003

(65) Prior Publication Data

US 2003/0212892 A1 Nov. 13, 2003

(30) Foreign Application Priority Data

May 9, 2002 (JP) ............................. 2002-134097

(51) Int. Cl.
*H04L 9/08* (2006.01)
(52) U.S. Cl. ..................... 713/162; 713/156
(58) Field of Classification Search ................ 713/153, 713/155, 162, 175, 158, 156, 171; 726/15
See application file for complete search history.

(56) References Cited

U.S. PATENT DOCUMENTS

| 4,405,829 | A | * | 9/1983 | Rivest et al. ................... 380/30 |
| 5,745,574 | A | * | 4/1998 | Muftic ........................ 713/157 |
| 5,885,315 | A | | 3/1999 | Fredholm et al. |
| 6,154,841 | A | | 11/2000 | Oishi |
| 6,233,341 | B1 | | 5/2001 | Riggins |
| 6,782,474 | B1 | * | 8/2004 | Ylonen ........................ 713/162 |
| 7,155,500 | B2 | * | 12/2006 | Nikander ..................... 709/223 |
| 2002/0144109 | A1 | * | 10/2002 | Benantar et al. ............. 713/156 |

2004/0250072 A1 12/2004 Yionen

FOREIGN PATENT DOCUMENTS

| EP | 1 164 745 A2 | 12/2001 |
| EP | 1 175 038 | 1/2002 |
| EP | 1 355 447 | 10/2003 |
| FI | 105739 | 12/1999 |
| JP | 2002-014613 | 1/2002 |

OTHER PUBLICATIONS

"The Point-to-Point Protocol (PPP)", The Internet Society, Network Working Group, Request for Comments: 1661, W. Simpson, Editor, Jul. 1994, pp. 1-52.
"PPP Challenge Handshake Authentication Protocol (CHAP)", The Internet Society, Network Working Group, Request for Comments: 1994, W. Simpson, Aug. 1996, pp. 1-12.
"Expectations for Computer Security Incident Response", The Internet Society, Network Working Group, Request for Comments: 2350, N. Brownlee, et al., Jun. 1998, pp. 1-38.

(Continued)

*Primary Examiner*—Ellen Tran
(74) *Attorney, Agent, or Firm*—Fitzpatrick, Cella, Harper & Scinto

(57) ABSTRACT

A host requests a public key certificate from a gateway, and the gateway requests a public key certificate from a Certification Authority (CA). The CA generates a public key certificate, which is sent to the host through the gateway. The host sets an IPv6 address based on information from the gateway. The host requests and receives a new public key certificate whenever necessary, and sends a public key certificate including the IPv6 address to the communication counterpart.

21 Claims, 13 Drawing Sheets

OTHER PUBLICATIONS

"An IPv6 Aggregatable Global Unicast Address Format", The Internet Society, Network Working Group, Request for Comments: 2374, R. Hinden, et al., Jul. 1998, pp. 1-12.

"IPv6 Multicast Address Assignments", The Internet Society, Network Working Group, Request for Comments: 2375, R. Hinden, et al., Jul. 1998, pp. 1-8.

"IP Version 6 Addressing Architecture", The Internet Society, Network Working Group, Request for Comments: 2373, R. Hinden, et al., Jul. 1998, pp. 1-26.

"Neighbor Discovery for IP Version 6 (IPv6)", The Internet Society, Network Working Group, Request for Comments: 2461, T. Narten, et al., Dec. 1998, pp. 1-84.

"Unconditionally Anonymous Public-key Certificates and their Applications", Kazuomi Oishi, Master of Science Thesis, University of California, Santa Barbara, Aug. 1999, pp. 1-48.

Thomson, et al., RFC 2462, "IPv6 Stateless Address Autoconfiguration", Dec. 1998, pp. 1-25.

Narten, et al., RFC 3041, "Privacy Extensions for Stateless Address Autoconfiguration in IPv6", Jan. 2001, pp. 1-17.

Harkins, et al., RFC 2409, "The Internet Key Exchange (IKE)", Nov. 1998, pp. 1-41.

Oishi, et al., "Anonymous Public Key Certificates and their Applications", IEICE Trans. Fundamentals, vol. E81-A, No. 1, Jan. 1998, pp. 56-64.

Office Action for corresponding European Application No. 03 252 537.0 dated Feb. 28, 2007.

T. Narten, et al., "Privacy Extensions for Stateless Address Autoconfiguration in IPv6", Standards Track, Jan. 2001, pp. 1-17.

K. Oishi, et al., "Anonymous Public Key Certificates and their Applications", IEICE Trans. Fundamentals, vol. E81-A, No. 1, Jan. 1998, pp. 56-64.

* cited by examiner

Anonymous Public Key Certificate
Issue Protocol (for Ethernet LAN)

Ethernet LAN Block Diagram

Node Architecture

FIG. 4

| C1 | C2 | C3 | M1 | M2 | M3 |

Ethernet MAC Address Architecture

FIG. 5

| C1' | C2 | C3 | 0xFF | 0xFE | M1 | M2 | M3 |

Interface ID Architecture

FIG. 6

| 0xFE | 0x80 | 0x0 | 0x0 | 0x0 | 0x0 | 0x0 | 0x0 | C1' | C2 | C3 | 0xFF | 0xFE | M1 | M2 | M3 |

A Tentative Link-Local Address Architecture

FIG. 7

| 0xFF | 0x02 | 0x0 | 0x0 | 0x0 | 0x0 | 0x0 | 0x0 | 0x0 | 0x0 | 0x0 | 0x1 | 0xFF | M1 | M2 | M3 |

Architecture of Solicited-Node Multicast Address of Given Tentative Link-Local Address Flowchart of DAD Operation by Host Flowchart of Address Auto-Configuration by Host Flowchart of Retrieving Address with DHCP by Host Flowchart of Address Auto-Configuration and Receiving Anonymous Public Key Certificate by Host Flowchart of Receiving Address and Certificate with DHCP by Host Anonymous Public Key Certificate
Issue Protocol (for PPP)

Dial-Up/ADSL Connection Block Diagram

Flowchart of Retrieving Certificate by Host

PUBLIC KEY CERTIFICATION ISSUING APPARATUS

BACKGROUND OF THE INVENTION

1. Field of the Invention

The present invention relates to an apparatus for providing a public key certificate.

2. Description of the Related Art

With the emergence of IPv6, there is anticipated a situation which enables a network connection of an equipment, that has not been connectable to a network. An example of such equipment is a digital camera for end users, directly connectable to the Internet.

In a personal computer or a work station supporting IPv6, the Ethernet® is normally employed as an interface for connection with the network, and an IEEE identifier (MAC address) provided therein is used for constructing an IPv6 address.

The IPv6 is present in three kinds, namely a link local address, a site local address and a (aggregatable) global address.

An address system, including details of these addresses and a constructing method thereof, is described for example in RFC 2373 "IP Version 6 Addressing Architecture", RFC 2374 "An IPv6 Aggregatable Global Unicast Address Format", RFC 2375 "IPv6 Multicast Address Assignment", RFC 2350 "Proposed TLA and NLAA Assignment Rule", RFC 2461 "Neighbor Discovery for IP Version 6 (IPv6)", and RFC 2462 "IPv6 Stateless Address Autoconfiguration".

However, in case information corresponding one-to-one to a hardware, such as IEEE identifier (MAC address), is used in a fixed manner, such information may be regarded as corresponding one-to-one to the apparatus or the user thereof, and invasion of privacy may result by monitoring communications utilizing such address.

In order to prevent such drawback, a method of generating a random IPv6 address (more exactly an interface ID) is proposed for example in FRC 3041 "Privacy Extensions for Stateless Address Autoconfiguration in IPv6". There is also described a protocol (or extension thereof), in case a randomly generated value is already used, for detecting such state and calculating/generating another random value, thereby determining a unique random value.

Now let us consider an encrypted communication utilizing IPsec, in case the apparatus utilizes an IPv6 address generated by a method as described in the foregoing. IPsec is a protocol in which two apparatuses on the internet share secret data not known to any other, and encryption and authentication are executed based on such secret data, it is necessary in the communication to securely share secret data and mutual IPv6 addresses. The data such as the secret data and mutual IPv6 addresses are called SA (Security association).

A protocol for securely sharing SA is called IKE (Internet key exchange) and is defined in RFC 2409 "The Internet Key Exchange (IKE)". Securely sharing of SA means to securely share SA only with an intended counterpart, and requires secure authentication of the counterpart. The IKE defines four authentication methods, namely 1) a method utilizing a pre-shared key, 2) a method utilizing a digital signature, 3) authentication with public key encryption, and 4) a revised method of authentication with public key encryption.

However, in consideration of a situation realizing protection of privacy (not providing identifying information), for example in an IPsec communication of a user with a shopping site, it is practically impossible for the shopping site to share pre-shared keys with unspecified plural communication counterparts prior to the IPsec communication, so that the method utilizing the pre-shared key is not usable.

In other methods, it is possible execute IKE among unspecified plural communication partners in case information (public key in most cases) necessary for using the digital signature or the public key encryption can be made securely available. For this purpose, what is considered most promising is an environment or a system called PKI (public-key infrastructure), and, a public key certificate plays a principal role therein.

The public key certificate is a digital signature for confirming and ensuring a correspondence between an entity (entity executing communication such as a computer or a person) and a public key of such entity, issued by a third party reliable for a combination of the ID information etc. of the entity and the public key. The reliable third party is called CA (certification authority), and the public key for confirming the authority of the digital signature of CA is widely known.

However, the currently utilized public key certificate includes ID information of the owner (subject) such as FQDN (fully qualified domain name) and cannot therefore realize the privacy protection in this state.

There is also conceived a method of not including the ID information of the subject in the public key certificate, and such certificate is called anonymous public key certificate.

However, such anonymous public key certificate is still associated with a drawback same as in the aforementioned IEEE identifier (MAC address). More specifically, as long as a same anonymous public key certificate is used continuously, it is possible to link plural communications (such as IPsec based on the public key certificate), and, the correspondence between the anonymous public key certificate and the subject thereof, if found out even once, leads to an invasion of privacy, so that the level of privacy protection is still weak.

In consideration of these drawbacks, a strong privacy protection is conceived realizable if it is possible to use a different IPv6 address and a different anonymous public key certificate in a communication with a different counterpart. These are called one-time IPv6 address and one-time anonymous public key certificate. Such one-time IPv6 address may be changed for every communication counterpart or for every packet.

However, for such one-time IPv6 address, there is known the aforementioned FRC 3041 "Privacy Extensions for Stateless Address Autoconfiguration in IPv6", but there has not been known a method of efficiently and securely issuing the one-time anonymous public key certificate to an apparatus capable of IPv6 communication (hereinafter called IPv6 supporting apparatus).

There also exists a following drawback. In case the ID information of the communication counterpart is not known, the communication counterpart is identified by the IP address only. However, since a packet exchanged on a LAN of Ethernet® can be accessed by all the nodes on such LAN, in a situation of a communication between entities A and B, a malicious entity C present on the same LAN may impersonate as the entity A. More specifically, when the public key certificate of the entity A is transmitted to B for executing an IPsec communication based on a one-time anonymous public key certificate between A and B, C can disguise as A by replacing the public key certificate of A by that of C.

Such impersonation is also possible over a wider range not limited to a LAN, by applying a DoS (Denial of Services) attack to a DNS (Domain Name System) server or router and providing a false information by a false DNS server or router during such attack. Such situation can be coped with by confirming the ID of the counterpart in case such ID is known, but there has not been known a method of preventing such attack in the above-described situation of anonymous communication.

SUMMARY OF THE INVENTION

An object of the present invention is to realize a powerful privacy protection.

Another object of the present invention is to prevent impersonation and key-substitution attacks.

Still another object of the present invention is to efficiently and securely issue a one-time anonymous public key certificate including an IPv6 address as a target of certification, thus achieving prompt issuance without an error in the target of issuance.

Still another object of the present invention is to efficiently realize a one-time anonymous public key certificate that has a high level of privacy protection, is realizable with a low cost and shows a little burden at the execution.

Still another object of the present invention is to realize an IPsec communication in efficient manner.

Still another object of the present invention is to realize an IPsec communication with IKE, while realizing a powerful privacy protection and preventing impersonation.

Still other objects of the present invention will become apparent from following description of embodiments.

BRIEF DESCRIPTION OF THE DRAWINGS

FIG. 4 is a view showing an architecture of a MAC address of Ethernet®;

FIG. 5 is a view showing an architecture of an interface ID;

FIG. 6 is a view showing an architecture of a tentative link-local address;

FIG. 7 is a view showing an architecture of a solicited-node multicast address of a given tentative link-local address;

DETAILED DESCRIPTION OF THE PREFERRED EMBODIMENTS

First Embodiment

This embodiment shows a case where a host is connected to the internet through an Ethernet® LAN. At first there will be explained a current situation, and the present embodiment will be explained later.

Figure 2:
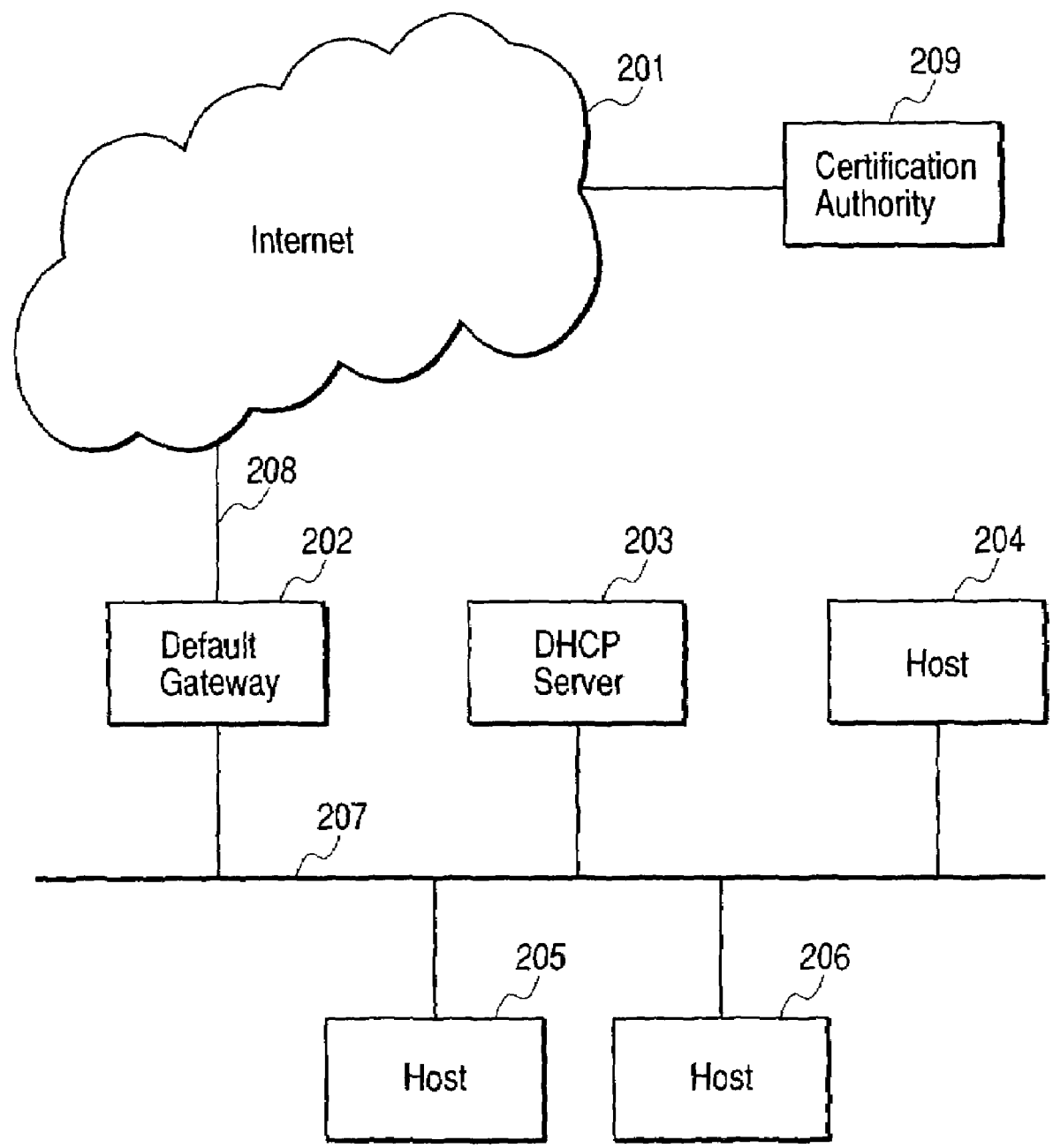
FIG. 2 is a block diagram of an Ethernet®.

FIG. 2 schematically shows a connection environment (connecting the host to the internet through an Ethernet® LAN) in which the present invention is applicable.

FIG. 2 shows an environment in which hosts 204, 205, 206 connected a LAN make an access to an internet 201 through a default gateway (gateway) 202. In the present embodiment, each host is connected through a link 207, which is specifically assumed as an Ethernet®. The link means a facility or a medium through which an apparatus connected thereto can execute communication, and is positioned at the lower side of the IP layer. In addition to the Ethernet®, the link may be a PPP link, a X.25, a frame relay or an ATM network.

An IPv6 supporting apparatus connected to the link is called a node.

Figure 3:
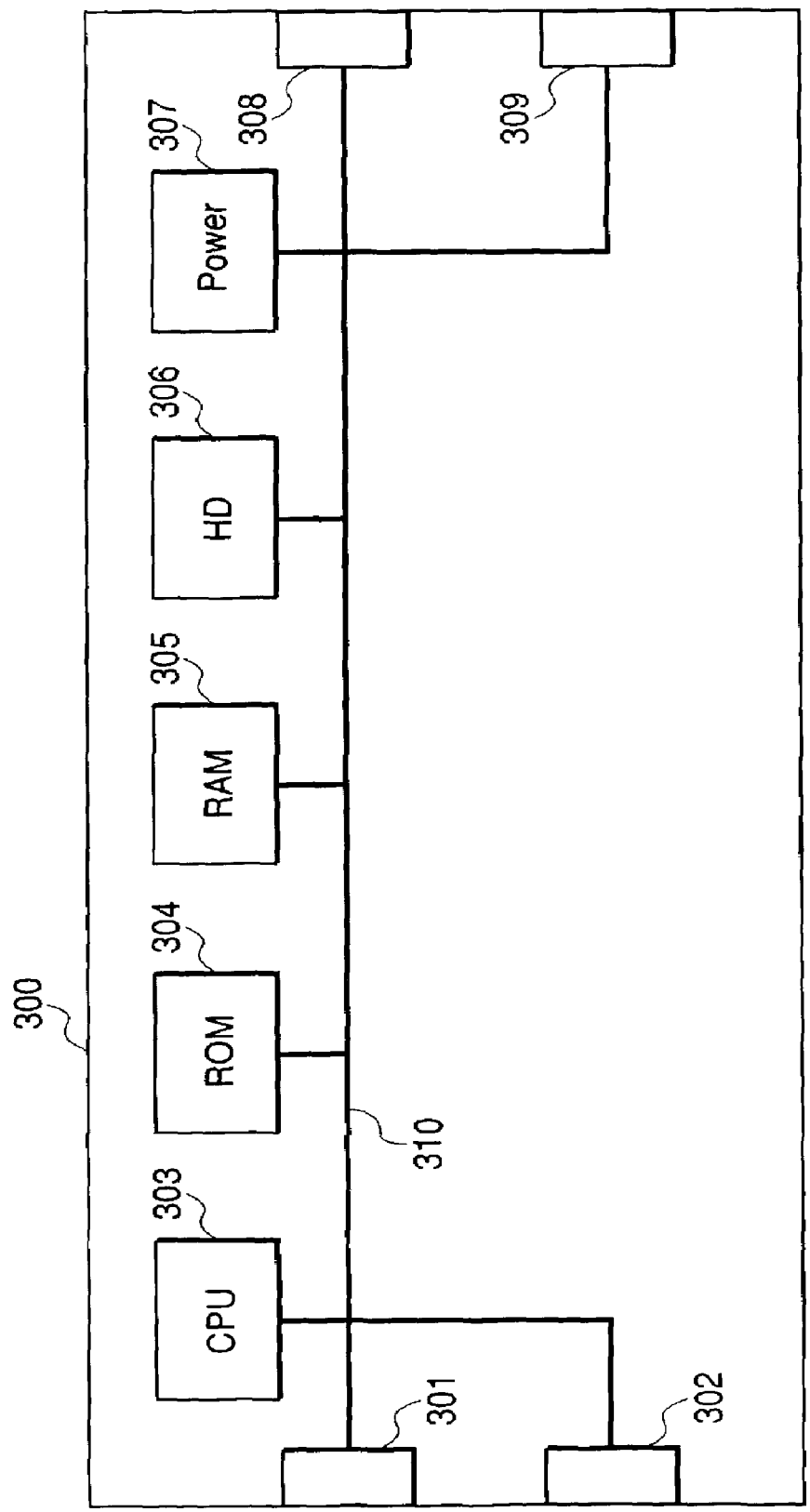
FIG. 3 is a view showing an architecture of a node.

FIG. 3 shows a typical internal architecture of a node.

The node can be a router or a host, and the router transfers a packet not addressed thereto, while the host does not execute such transfer. As will be apparent from FIG. 3, the node 300 is a computer having network interfaces 301, 302, a CPU 303, a ROM 304, a RAM 305, a HD (hard disk) 306, a power supply 307, an interface 308 for a keyboard/pointing device, an interface 309 for a monitor, a bus 310 etc.

The router has plural network interfaces 301, 302, but the host has only one network interface 301 in most cases. The network interface 301 is connected to the link 207, and communicates with another node connected to the link 207. The hosts 204, 205, 206 communicate, by the network interface 301 and through the link 207, with another node connected to the link 207, or with a site on the internet 201 further through a gateway 202. In the gateway (router) 202, the network interface 302 is connected with the internet 201, and the gateway (router) 202 executes communication through the internet 201, by the network interface 302. A certification authority 209 has an architecture similar to that in FIG. 3. The certification authority 209 is connected to the internet 201 through the network interface 301. The HD may be absent in certain nodes.

Following process content (procedure) is realized as an apparatus or a program. In case of realization as an apparatus, a mode 300 having such apparatus executes a following process content (procedure). In case of realization as a program, a node in which the program is stored in the ROM 304 or the HD 306 executes the following process content (procedure). For example, in case of realization as a program, the CPU 303 executes operations of reading such program, and assigning an address to the interface 301 through the bus 310 while utilizing the RAM 305 as a space for calculation if necessary.

In the following there will be briefly explained the architecture of a protocol in which each host retrieves a prefix of an IPv6 global address or an address of the default gateway in the Ethernet® LAN environment in the present embodiment, and then explained is a specific embodiment embodying the present invention.

Figure 8:
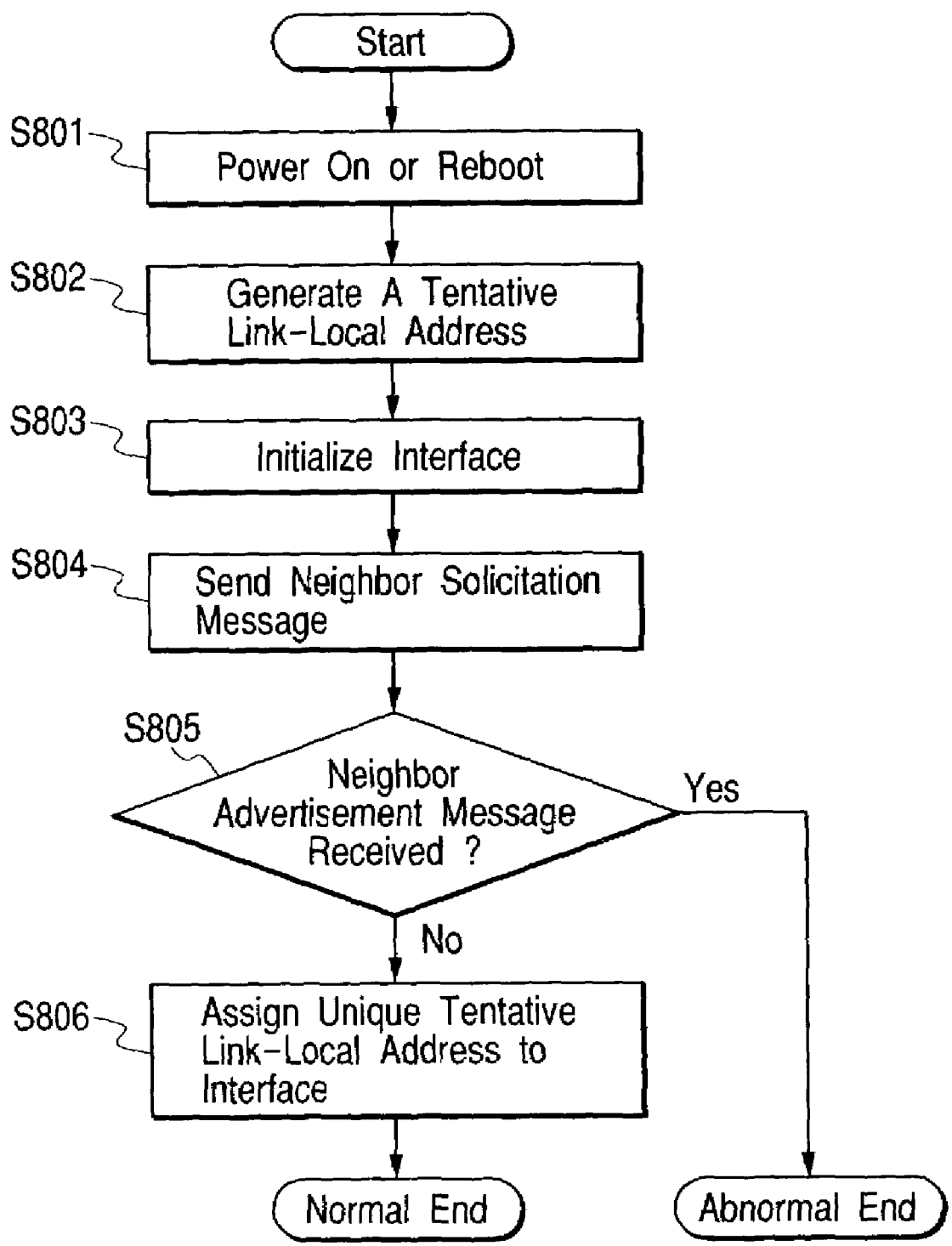
FIG. 8 is a flow chart showing operations until a host completes DAD.

FIG. 8 shows a flow chart of a procedure executed by a node 300 shown in FIG. 3, when the power supply is turned on or in case of a re-booting. This procedure is called DAD (duplicate address detection). In the following there will be explained contents of the procedure along the flow shown in FIG. 8.

After the node 300 is powered or re-booted in a step S801, an interface ID (cf. FIG. 5) is prepared from a MAC address of Ethernet® (MAC address) (cf. FIG. 4) of the network interface 301, and is used as a tentative link-local address (cf. FIG. 6) (step S802).

Then, in order to discriminate whether such tentative link-local address is unique on the link 207, the node (host) 300 executes a following procedure.

At first there is executed an initialization of the interface 301. More specifically, an all-nodes multicast address (FF02::1) and a solicited-node multicast address, which is a tentative link-local address thereof, are assigned to the interface 301 (FIG. 7). As a result, the interface 301, upon finding a packet addressed to the all-nodes multicast address or to the solicited-node multicast address of the tentative link-local address thereof, receives such packet as addressed to such interface.

The assigning of the former (all-nodes multicast address) allows to receive data from another node which already uses such tentative link-local address. Also the assigning of the latter (solicited-node multicast address of such tentative link-local address) allows to detect the presence of another node which is going to simultaneously use same tentative link-local address.

The solicited-node multicast address of a tentative link-local address is, as defined in page 91 of RFC 2461, data formed by adding lower 24 bits of the tentative link-local address to a prefix FF02:0:0:0:0:1:FF00::/104 and constitutes a link-local scope multicast address. FIGS. 6 and 7 show these relationship. The aforementioned address assignment is executed in a step S803 in FIG. 8.

Then a Neighbor Solicitation message is prepared. In the Neighbor Solicitation message, a tentative link-local address of a target of judgment is set in a Target Address, and an unspecified address (128 bits all being 0) is set as an IP source (transmission source address), and a solicited-node multicast address of the tentative link-local address of the target of judgment is set in an IP destination (destination address).

This Neighbor Solicitation message is transmitted to the Ethernet® DupAddrDetectTransmits times with a millisecond interval of RetransTimer. This process is executed in a step S804 in FIG. 8.

Upon receiving the Neighbor Solicitation message, the node judges that such message is from a node executing DAD, in case the transmission source address is the unspecified address.

In case plural nodes executes DAD for a same address, there is received, in addition to a Neighbor Solicitation message sent by itself, another Neighbor Solicitation message containing a same address in the Target Address (namely a Neighbor Solicitation message transmitted by itself and a Neighbor Solicitation message transmitted by another node executing DAD for a same address), whereby a duplication can be identified. In such case, such address is not used by any node.

In case the received Neighbor Solicitation message is the one transmitted by itself (namely by loop-back of the multicast packet), it does not indicate the presence of another node which uses or is going to use such address. In case of receiving, in addition to the Neighbor Solicitation message transmitted by itself, a Neighbor Solicitation message including a same address in the Target Address, there is judged that plural nodes are executing DAD for a same target address.

On the other hand, in case a node receiving the Neighbor Solicitation message already uses an address contained in the Target Address of such message, it returns a multicast Neighbor Advertisement, in which such tentative link-local address is set in the Target Address, to an all-nodes multicast address. Thus, in case the node, having transmitted the Neighbor Solicitation message, receives a multicast Neighbor Advertisement addressed to the all-nodes multicast address and the target address thereof is the tentative address (target) (corresponding to a case "YES" in a step S805 in FIG. 8), it can be judged that the tentative address of the target is not unique (namely duplicated).

In case the aforementioned DAD confirms that the tentative link-local address of the target is unique on the link 207 (corresponding to a case "NO" in a step S805 in FIG. 8), such address is assigned as a link-local address to the interface 301. This operation corresponds to a step S806 in FIG. 8, and the DAD process is terminated.

The aforementioned procedure of FIG. 8 can be executed in each of the default gateway 202 shown in FIG. 2, the DHCP server 203, and the hosts 204, 205, 206.

A host in FIG. 2, for example the host 206, after assigning the link-local address to the interface 301, tries to obtain necessary information for determining a site local address or a global address (such information being called Router Advertisement) from the default gateway 202.

Figure 9:
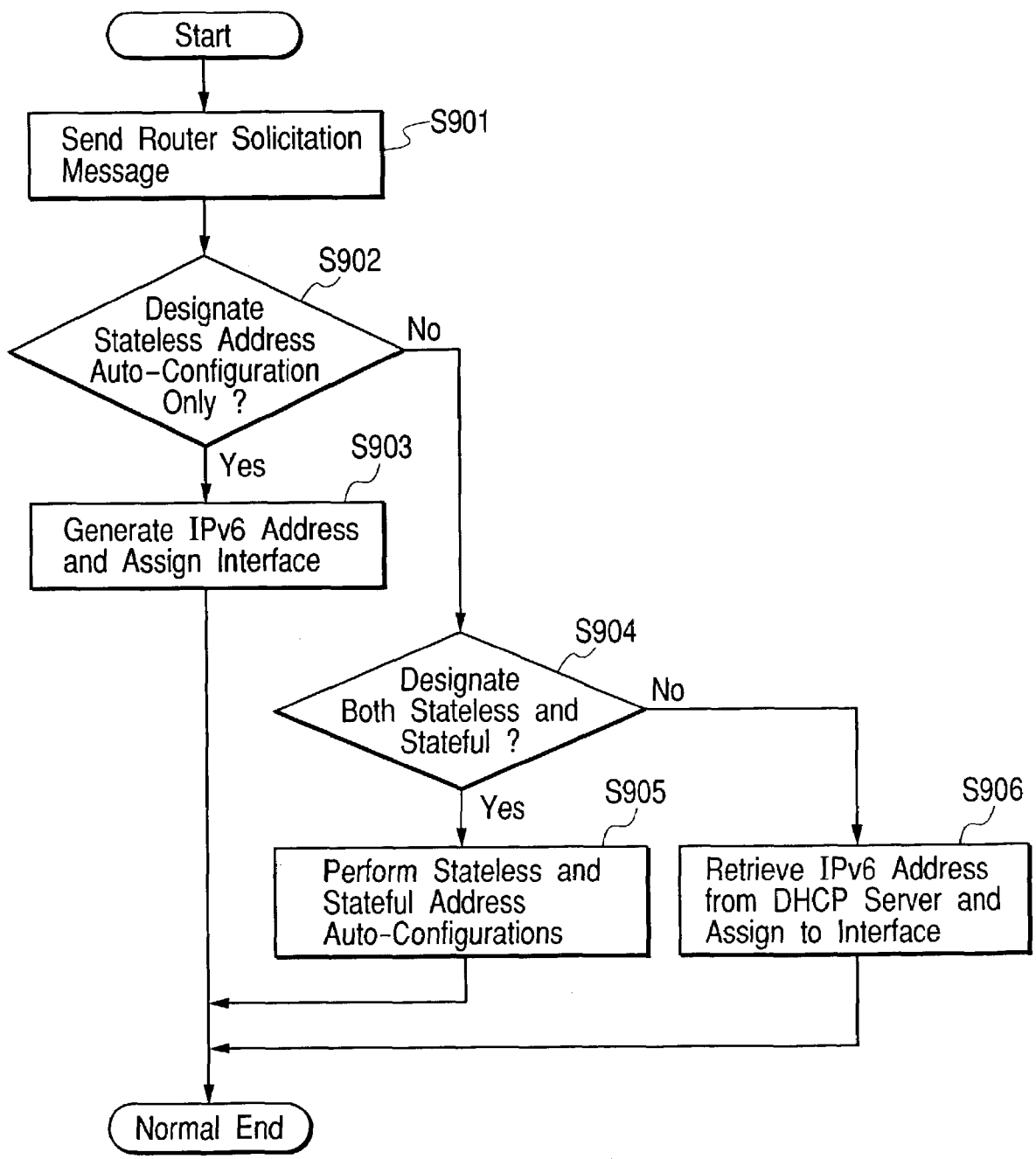
FIG. 9 is a flow chart showing operations until the host completes an address autoconfiguration.

Such operation is shown in FIG. 9. The default gateway 202, normally called a router, will be hereinafter represented as a router 202. The router 202 is given necessary setting by an administrator, and periodically transmits a Router Advertisement to the link 207. In case the host 206 wishes to obtain the Router Advertisement promptly, it sends data, called Router Solicitation, to the router 202. Immediately after the assignment of the link-local address, the host 206 cannot identify the presence of the router 202, so that the Router Solicitation is transmitted as a multicast to all the routers on the link 207. In FIG. 9, a step S901 indicates this process.

The router 202, having received the Router Solicitation, sends a Router Advertisement. As indicated by a case "YES" in a step S902 in FIG. 9, the host 206, having received a Router Advertisement message designating a Stateless address autoconfiguration only, confirms validity (for example not being already used in the apparatus) of the prefix in the received message, and assigns an address prepared by adding a suitable interface ID thereto, as a site local address or a global address to the interface 301. A step S903 in FIG. 9 corresponds to this process.

In case, as indicated by a case "NO" in the step S902 in FIG. 9, the host 206 does not receive a Router Advertisement message designating a Stateless address autoconfiguration only, the process is divided into following two cases, namely a case of receiving a Router Advertisement designating both a stateless address autoconfiguration and a stateful address autoconfiguration ("YES" in step S904) and a case not receiving any Router Advertisement ("NO" in the step S904).

In the latter case, there is executed a stateful address autoconfiguration, namely DHCPv6 only. This operation corresponds to a step S906, of which details are shown in FIG. 10.

Details of a content and a format of the messages exchanged in the stateful address autoconfiguration are described in "draft-ietf-dhc-dhcpv6-xx. txt" (xx=23 being latest version in March 2002). In the following there will be explained a flow of basic operations along numbers in FIG. 10.

The DHCP server 203 is subjected to necessary settings by the administrator. More specifically, its link local address as a node is assigned to the network interface 301, and there is also set a prefix etc. for a site local address or a global address necessary for behaving as the DHCP server.

Figure 10:
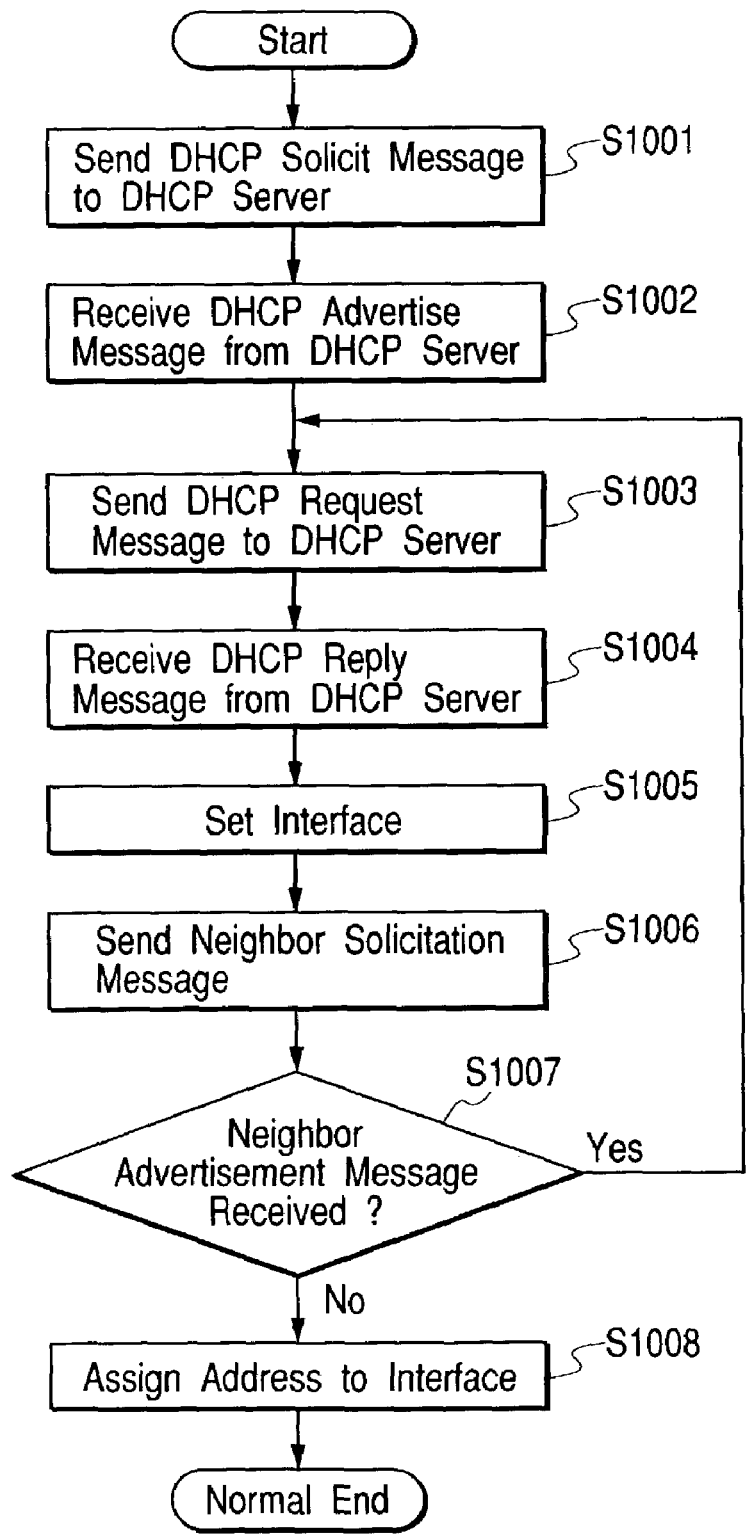
FIG. 10 is a flow chart showing operations until the host retrieves an address by DHCP.

In a step S1001 in FIG. 10, the host 204 sends a DHCP Solicit Message to the DHCP server. As the host 206 does not know the location of the DHCP server, it is sent to the link 207 as a multicast to the DHCP server. In case the DHCP server is present in a link (not shown) different from the link 207 to which the host 206 is connected, the DHCP Solicit Message is in fact delivered to the DHCP server 203 through a DHCP relay (not shown).

The DHCP server 203, receiving the DHCP Solicit Message, returns a DHCP Advertise Message as a response to the host 206. It is delivered to the host 206 (through the DHCP relay in case of different links). This operation constitutes a step S1002. At this point, the host 206 knows the address of the DHCP server 203.

Then, in a step S1003, the host 206 sends a DHCP Request Message to the DHCP server 203. Upon receiving the DHCP Request Message, the DHCP server 203 sends a DHCP Reply Message to the host 206 in a step S1004.

The host 206, having received the DHCP Reply Message in the step S1004, can know a site local address or a global address therein and executes a process necessary for the DAD process, in order to confirm whether the interface ID in such address shows a duplication. More specifically the aforementioned multicast address etc. are set in the interface 301. This operation constitutes a step S1005.

Then a step S1006 sends a Neighbor Solicitation Message, and a step S1007 discriminates whether a Neighbor Advertisement Message is received. In case of reception, such address shows a duplication, so that the sequence returns to the step S1003 for receiving another address from the DHCP server 203 and repeats the aforementioned process.

In case the Neighbor Advertisement Message is not received in the step S1007 in FIG. 10, the address does not show duplication and the host 206 assigns, in a step S1008, such address to the interface 301.

Thus the step S906 in FIG. 8 is terminated. The sequence is terminated in normal manner in case no Router Advertisement is received in the step S904.

In case the step S902 receives a Router Advertisement message designating both the stateless address autoconfiguration and the stateful address autoconfiguration, a step S905 executes both a stateless address autoconfiguration and a stateful address autoconfiguration. The content of the process is same as that of the steps S903 and S906.

As explained in the foregoing, the host 206 having the Ethernet® 207 as the interface can utilize the stateless address autoconfiguration and the stateful address autoconfiguration in an arbitrary combination, thereby automatically setting the link local address, the site local address, the global address, the default gateway etc.

In the aforementioned protocol, by employing a random value for the interface ID, executing DAD for such value as the target and confirming the uniqueness in the ink 207, there can be utilized a one-time IPv6 global address in combination with a prefix of the global address. Such process is described in RFC 3041 "Privacy Extensions for Stateless Address Autoconfiguration in IPv6".

In the following there will be explained an embodiment of the present invention, in which the aforementioned operations (protocol) are expanded to enable the use of a one-time anonymous public key certificate. At first there will be explained an example of an anonymous public key certificate, and then a protocol for efficient issuance thereof will be explained.

As to the anonymous public key certificate, a concept and a specific realizing method therefor are proposed by Kazuomi Oishi, Masahiro Mambo, and Eiji Okamoto, "Anonymous Public Key Certificates and their Applications" IEICE Transactions on Fundamentals of Electronics, Communications and Computer Sciences, E81-A, 1, pp. 56-64, 1998, and a basic realizing method is disclosed in U.S. Pat. No. 6,154,851. In these methods, the anonymity of the certificate is ensured by the amount of calculation.

For providing a stronger anonymity, a method of realizing an anonymous public key certificate with unconditional anonymity is disclosed by Kazuomi Oishi, "Unconditionally anonymous public key certificates", The 2000 Symposium on Cryptography and Information Security, SCIS2000-C32, 2000.

In the present invention, there can be utilized any scheme described in the aforementioned paper by Kazuomi Oishi, Masahiro Mambo and Eiji Okamoto, "Anonymous Public Key Certificates and their Applications". If an inferior efficiency is tolerated, there can also be utilized a scheme 1, a scheme 2 or a scheme 3 in the aforementioned paper, and these are also included in the present invention.

The present embodiment shows a case where an anonymous public key certificate with computational anonymity is utilized. The protocol of the present embodiment will be explained after defining symbols necessary for the explanation.

An entity CA issuing an anonymous public key certificate determines large prime numbers p and q as common parameters. The prime number q can divide p−1. There are determined a generator g of an order q and a Hash function H. A secret random number s_ca (between 1 and q, inclusive) is generated and $v\_ca = g^{(s\_ca)} \bmod p$ is calculated. $A = (B)^{(C)} \bmod D$ means a calculation, for integers A, B, C and D, of dividing B to a power C with D to obtain a remainder A. The entity CA discloses p, q, g, H and v_ca. Therefore, the entity i knows p, q, g, H and v_ca.

On the other hand, an entity i utilizing the anonymous public key certificate generates a secret random number s_i (between 1 and q, inclusive) and calculates $v\_i = g^{(s\_i)} \bmod p$. s_ca and s_i are called secret keys while v_ca and v_i (and disclosed parameters) are called public keys, and the secret keys are so stored as not to be disclosed to any other party. The entity CA or i knows the public keys v_ca and c_i (and public parameters (such as g)).

At the start of use of the anonymous public key certificate, the entity i registers its entity name (user name), a password and the public key v_i to the entity CA. The entity CA confirms, if necessary, the identity of the entity i by physical means or the like, and memorizes the entity name (user name), the password and the public key v_i.

In issuing an anonymous public key certificate, the entity CA generates a random number r (between 1 and q, inclusive), and calculates $(g', v\_i') = (g^r \bmod p, (v\_i)^{(r)} \bmod p)$. Let X be management/attribute information of a certificate. Then, X includes the aforementioned public parameters, the validity period of the anonymous public key certificate, a public key certificate for the public key v_ca, etc. A digital signature is generated for a message (a Hash value thereof) including (g', v_i') and X. CA can utilize a digital signature scheme based on a discrete logarithm problem, for example a Schnorr signature. In this embodiment, a digital signature is generated utilizing the secret key s_ca. Such digital signature is represented as Sig_ca(g', v_i', X).

An anonymous public key certificate APC_ca(i) issued by the entity CA to the entity i is APC_ca(i)=(g', v_i', X, Sig_ca (g', v_i', X)). In a variation of the present invention, the public key certificate for v_ca is not included in the management/attribute information X.

Receiving the issuance of the anonymous public key certificate APC_ca(i)=(g', v_i', X, Sig_ca(g', v_i', X)), the entity i extracts (g', v_i', X) and calculates a Hash value thereof (for example H(g'|v_i'|X), wherein "|" indicates concatenation), thereby confirming whether Sig_ca(g', v_i', X) is a correct digital signature for the Hash value, utilizing the public key v_ca. It also confirms v_i'=(g')^(s_i) mod p. Upon confirmation of these as correct, there can be utilized a public key encryption or a digital signature based on discrete logarithm problem utilizing g' and v_i' (and common parameter p) as public keys and s_i as a secret key.

An entity, receiving the anonymous public key certificate APC_ca(i)=(g', v_i', X, Sig_ca(g', v_i', X)), extracts (g', v_i', X) and calculates a Hash value thereof, thereby confirming whether Sig_ca(g', v_i', X) is a correct digital signature for the Hash value, utilizing the public key v_ca. Upon confirmation as correct, there are executed a public key encryption or an authentication of a digital signature based on discrete logarithm problem utilizing g' and v_i' (and common parameter p) as public keys.

In the foregoing there has been explained a signature system based on the difficulty of obtaining a discrete logarithm problem on a multiplicative group (mod p), but it is also possible to utilize a signature system based on the difficulty of obtaining a discrete logarithm problem on an elliptical curve, and, in such case, the efficiency can be further improved as a same level of security can be anticipated with a key of a smaller number of bits in comparison with the case of the multiplicative group.

In the following there will be explained a case of applying the aforementioned anonymous public key certification system to the environment shown in FIG. 2.

The Certification Authority 209 becomes the entity CA, while the host 206 (or the user thereof) becomes the entity utilizing the anonymous public key certificate. However, the Certification Authority 209 does not have all the functions of the CA in the aforementioned anonymous public key certificate system. In the following, there will be explained a case where the IPv6 supporting apparatus, which is located in a local link 207 of an IPv6 supporting apparatus (host 206), utilizing the public key certificate, and which is relied on by the public key certificate issuer (CA, namely Certification Authority 209), is the default gateway 202. Stated differently, there will be explained a case where a part of the functions of the entity CA in the anonymous public key certificate system is owned by the default gateway 202 instead of the Certification Authority 209.

Also the IPv6 supporting apparatus relied on by the CA 209 can be a DHCP server or an exclusive CA server. In the following there will be explained an architecture where a random IPv6 address is included in the certificate, but there can also be conceived an architecture in which the random IPv6 address is not included in the certificate. As explained in the foregoing, the default gateway 202 will be hereinafter called a router 202.

The administrator of the Certification Authority 209 determines and discloses the aforementioned public parameters p, g etc. Also it determines a public key v_ca for the entity CA.

A fact that the Certification Authority 209 can rely on the default gateway 202 (or DHCP server or exclusive CA server) means herein that a person or organization who is responsible for the management of the default gateway 202 etc. is specified and that an agreement is made between the Certification Authority 209 and such management person or organization on a condition that such management person or organization becomes responsible for an eventual trouble. For example, it means a case where a signing contract is made between the Certification Authority 209 and the management person or organization that, in case of a trouble on an anonymous public key, the management person or organization of the default gateway 202 etc. will be responsible for identifying the user of such anonymous public key and causing such user to resolve the trouble.

It is also assumed in this case that the Certification Authority 209 and the default gateway 202 (or DHCP server or exclusive CA server) can execute a secure and reliable communication through the internet, for example by securely exchanging public key cryptograms or securely sharing a secret encrypting key.

The router (gateway) 202 has a function of controlling the transfer of packets, and is operated under the management of the administrator, so as not to cause inappropriate packet exchange between a subnet managed by the router and the exterior. For a subnet to be connected to the internet, the administrator of the subnet registers the identity to JPNIC (in case of Japan) and receives an assignment of a set of IP addresses. The router in the subnet therefore is managed by the administrator with a clear responsibility of management and is expected to spend costs for the operation and management also in consideration of the security, it can be considered appropriate to be relied upon by the Certification Authority 209.

When a user i applies for an access to the LAN, the user generates its own secret key s_i utilizing the public parameters p, g etc., calculates a corresponding public key v_i and submits the user name, the password and the public key v_i to the administrator of LAN (administrator of the router 202). The administrator of LAN (administrator of the router 202), after executing an identification of the user i and a password check according to its operating policy, permits an access. The administrator makes a registration in the RAM 304 or the HD 306 in such a manner that the corresponding public key can be retrieved from the entity name. The public parameters p, g etc. and the public key v_i, and particularly the secret key s_i are managed by the user i and are made securely usable in the host 206.

Figure 1:
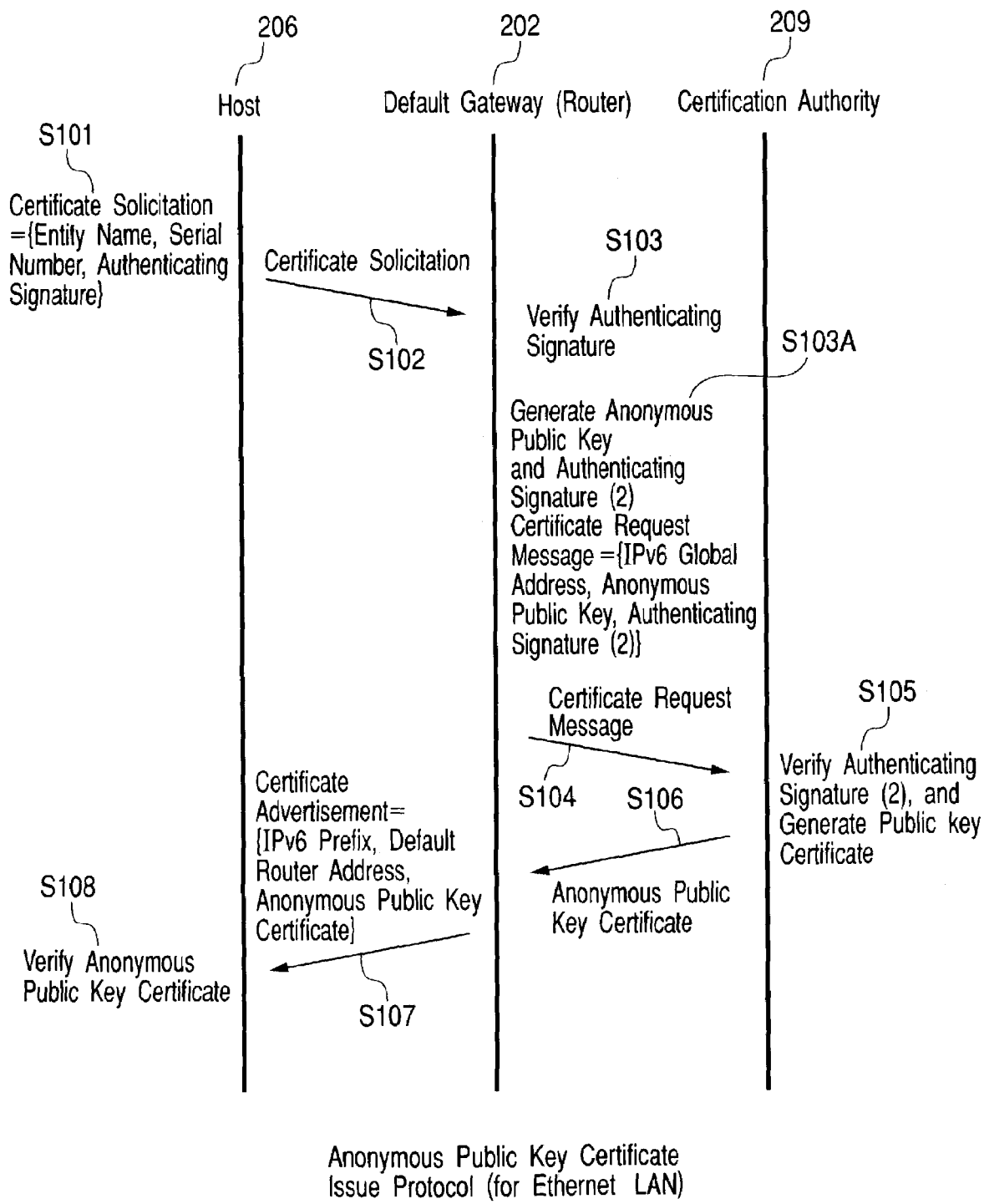
FIG. 1 is a view showing a protocol for issuing an anonymous public key certificate (for Ethernet® LAN) in a first embodiment.

FIG. 1 shows a protocol of the present embodiment, which is executed after the aforementioned preparations. FIG. 1 shows an issuing protocol for an anonymous public key certificate between an entity (IPv6 terminal utilized by the user i) constituted by the host 206, and an entity CA constituted by the Certification Authority 209 which relies on the router 202. The router 202 serves as an address information providing apparatus or an address information provider which provides the host (communication apparatus) 206 with address information for setting an address. The address information is a prefix of the global address of IPv6, or the global address itself of IPv6.

Since it is necessary to specify the entity in order to issue the anonymous public key certificate, there is executed a specifying (authentication) protocol between the router 202 and the entity (host 206 in this case). In the present embodiment, there will be adopted a system based on a public key cryptography as will be explained in the following. The operations will be explained according to a flow in FIG. 1.

In a step S101, the host 206 generates a Certificate Solicitation. The Certificate Solicitation is a message requesting an anonymous public key certificate and is generated in such a format understandable to the router 202 that it requests an anonymous public key certificate and that it contains the interface ID of the interface 301. The content is calculated from the entity name (user name), the password and a serial number. The serial number can be, for example, formed by concatenating an IPv6 link local address of the host 206, an IPv6 link local address of the default gateway and a current time. In order to prevent a replay attack and an impersonation, the Certificate Solicitation contains a digital signature (authenticating signature) (=Sig_i(hash(entity name, password, serial number))) generated by entering the entity name (user name), the password and the serial number into the Hash function utilizing the secret key s_i.

Then, in a step S102, the host 206 sends the Certificate Solicitation to the router 202 from the network interface 301.

In a step S103, the router 202 retrieves, based on the entity name (identifier) contained in the Certificate Solicitation received from the network interface 301 in the step S102, the registered public key v_i from the RAM 305 or the HD 306, and confirms the legitimacy of the authenticating signature utilizing such public key. More specifically, the entity name (user name), the password and the serial number are entered into the Hash function to obtain a Hash value, and it is confirmed that the authenticating signature is a proper digital signature therefor by the public key v_i. In more details, when the interface 301 receives the Certificate Solicitation including the digital signature from the host 206, the CPU 303 confirms the legitimacy of the digital signature utilizing the public key v_i of the host 206. In this manner, the router 202 authenticate the host 206 based on the public key cryptography.

After the authentication, the router 202 generates an IPv6 global address of the host 206 from the prefix of the IPv6 global address and the interface ID of the interface 301 of the host 206. Then, in a step S103A, it generates a random number r, and determines (g', v_i')=(g^r mod p, (v_i)^(r) mod p) from the generator g and the public key v_i as explained in the foregoing (g' and v_i' being called anonymous public keys). In this manner, the CPU 303 generates a public key v_i' from the public key v_i. Then there is generated an authenticating signature (2) which is a signature of the router 202 for the IPv6 global address of the host 206 and the anonymous public keys (g', v_i').

In the foregoing, the public key v_i' is generated after a successful authentication, but, in a variation, the public key v_i' is generated and registered in the RAM 305 or in the HD 306 prior to the success of the authentication or before the anonymous public key certificate is solicited.

Finally, in a step S104, an anonymous public certificate requesting message, including the IPv6 global address, the anonymous public keys and the authenticating signature (2) thereto={IPv6 global address, anonymous public key, authenticating signature (2)} is transmitted from the network interface 302 to the Certification Authority 209 through the internet 201. More specifically, the interface 302 transmits, under the control of the CPU 303, a public key certificate requesting message, requesting the issuance of a public key certificate for the anonymous public keys (g', v_i'), to the Certification Authority 209. The Certification Authority 209 serves as an issuer or an issuing apparatus for issuing the public key certificate. The router 202 serves as an apparatus which generates the public key. The interface 301 of the router 202 serves as communication means which communicates with the communication apparatus (host 206) through the network 207, and the CPU 303 serves as generation means which generates the public key. Also the interface 302 of the router 202 serves as transmission means which, in response to a request for the public key certificate from the communication apparatus (host 206), transmits the public key generated by the CPU 302 to the public key certificate issuer (CA209).

As the router 202 and the Certification Authority 209 can execute a secure communication through the internet as explained in the foregoing, there can be prevented fears of a data forging or a impersonation by a third party.

In a step S105, the Certification Authority 209 confirms whether the authenticating signature (2), received from the network interface 301, is generated in a truly legitimate router 202. In case of reception by the aforementioned secure and reliable communication, the fact of such reception itself may prove that the data are generated in the legitimate router 202. Otherwise the proof may be obtained from the digital signature based on the public key cryptography.

In any case, having confirmed the legitimacy of the authenticating signature (2), the Certification Authority 209 generates a digital signature Sig_ca(g', v_i', X) for a message (namely Hash value) formed by adding, to the IPv6 global address and the anonymous public keys (g', v_i') contained in the certificate requesting message, management/attribution X relating thereto. This digital signature utilizes the secret key s_ca. The management/attribute information X of the circuits includes public parameters, an validity period of the certificate and a public key certificate for v_ca. In a variation of the present invention, the public key certificate for v_ca is not included in the information X. The anonymous public key certificate APC_ca(i) are constituted by data, formed by the IPv6 global address, the anonymous public keys (g', v_i'), the management/attribute information X relating thereof, and the digital signature. Thus, when the interface 301 receives the public key certificate requesting message from the router 202, the CPU 303 generates the digital signature for the message including the IPv6 global address, the public keys (g', v_i') (and management/attribute information X of the certificate), which are contained in the public key certificate requesting message. The router 202 serves as a provider which provides the host 202 (communication apparatus) with address information for setting the address.

Then, in a step S106, an anonymous public key certificate APC_ca(i)=(g', v_i', X, Sig_ca(g', v_i', X)) is sent from the network interface 301 to the router 202 through the internet 201. Stated differently, the interface 301 issues a public key certificate including the address information of the IPv6 global address, the public keys (g', v_i') and the digital signature.

Having received the anonymous public key certificate from the network interface 302, the router 202, in a step S107, transmits a Certificate Advertisement, constituted by a prefix of the IPv6 global address, an address of the default router 202, and the anonymous public key certificate, from the network interface 301 to the authenticated host 206. In an embodiment of the present invention, the transmission is made under encryption with the registered public key v_i. More specifically, the interface 301 transmits, to the host 206, a public key certificate issued for the public keys (g', v_i') by the Certification Authority 209. The host 206 is a communication apparatus authenticated in the step S103, and serves as a transmission source for the Certificate Solicitation including the digital signature of which legitimacy is confirmed in the step S103.

In a step S108, the host 206 extracts the prefix from the Certificate Advertisement received from the network interface 301, and generates the IPv6 global address, thereby confirming the legitimacy of the anonymous public key certificate.

At this point, the host 206, utilizing the public key v_ca of the Certification Authority 209, confirms the legitimacy of the anonymous public key certificate APC_ca(i)=(g', v_i', X, Sig_ ca(g', v_i', X)), namely a legitimate correspondence between (g', v_i') and Sig_ca(g', v_i', X). For example, the host 206 extracts (g', v_i', X) from the anonymous public key certificate APC_ca(i) and calculates a Hash value thereof (for example H(g'|v_i'|X), wherein "|" indicates concatenation), thereby confirming whether Sig_ca(g', v_i', X) is a correct digital signature for the Hash value, utilizing the public key v_ca. The host 206 memorizes the public key v_ca of the Certification Authority 209 in advance. In an architecture where the public key certificate of the public key v_ca is included in the management/attribute information X of the anonymous public key certificate, the host 206 at first confirms that the memorized public key v_ca coincides with the public key v_ca in the public key certificate, included in the management/attribute information X of the anonymous public key certificate, and then confirms the legitimacy of the anonymous public key certificate utilizing such public key v_ca.

Figure 11:
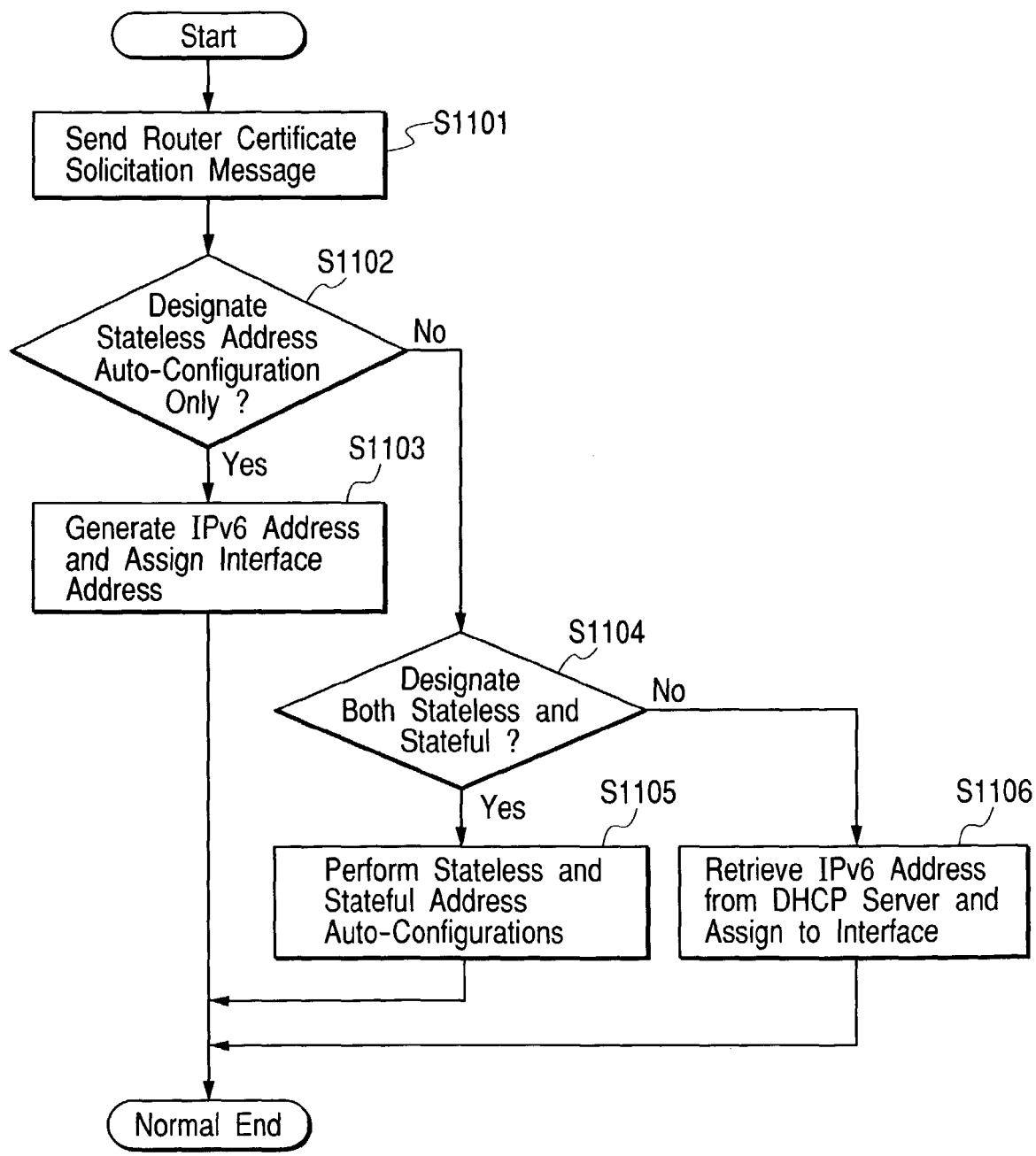
FIG. 11 is a flow chart showing operations until the host executes an address autoconfiguration and receives an anonymous public key certificate.

FIG. 11 shows a flow chart showing the host operation in an extended protocol in which the above-described protocol is combined with a known transmission/reception protocol for the Router Solicitation and Router Advertisement.

In a step S1101 in FIG. 11, a Router Certificate Solicitation Message is data including both the Router Solicitation in the step S901 shown in FIG. 9 and the Certificate Solicitation transmitted in the step S102 shown in FIG. 1. Upon receiving such data, the router 202 executes processes of S103, S103A and S104 shown in FIG. 1, and receives an anonymous public key certificate from the Certification Authority 209 as in the step S106. Then the router 202 sends a Router Advertisement designating a stateless address autoconfiguration only and a Router Certificate Advertisement Message, including both a Router Advertisement and a Certificate Advertisement, to the host 206.

Consequently, a Router Certificate Advertisement Message received in a step S1102 is data including both the Router Advertisement Message received in the step S902 in FIG. 9 and the Certificate Advertisement received in the step S107 in FIG. 1.

In case of confirmation of the legitimacy by the step S108 in FIG. 1, namely in a case "YES" in a step S1102, the host 206 in a step S1103 generates an IPv6 global address, assigns it to the interface 301 and confirms the legitimacy of the anonymous public key certificate. In the present case, the legitimacy of the anonymous public key certificate is confirmed, as in the step S108, by the public v_ca of the Certification Authority 209.

Through the above-described protocol, it is rendered possible to issue a one-time IPv6 address and a corresponding one-time anonymous public key certificate by simply increasing the data, without changing the number of steps in the conventional protocol.

In case the DHCP server 203, instead of the router 202, is relied on by the Certification Authority 209, as the Router Certificate Advertisement Message is not received, the DHCP server 203 executes, instead of the router 202, a protocol similar to FIG. 1, in a step S1106 in FIG. 11. The management person or organization of the DHCP server is assumed, like that of the default gateway 202, to be responsible in case of a trouble.

Figure 12:
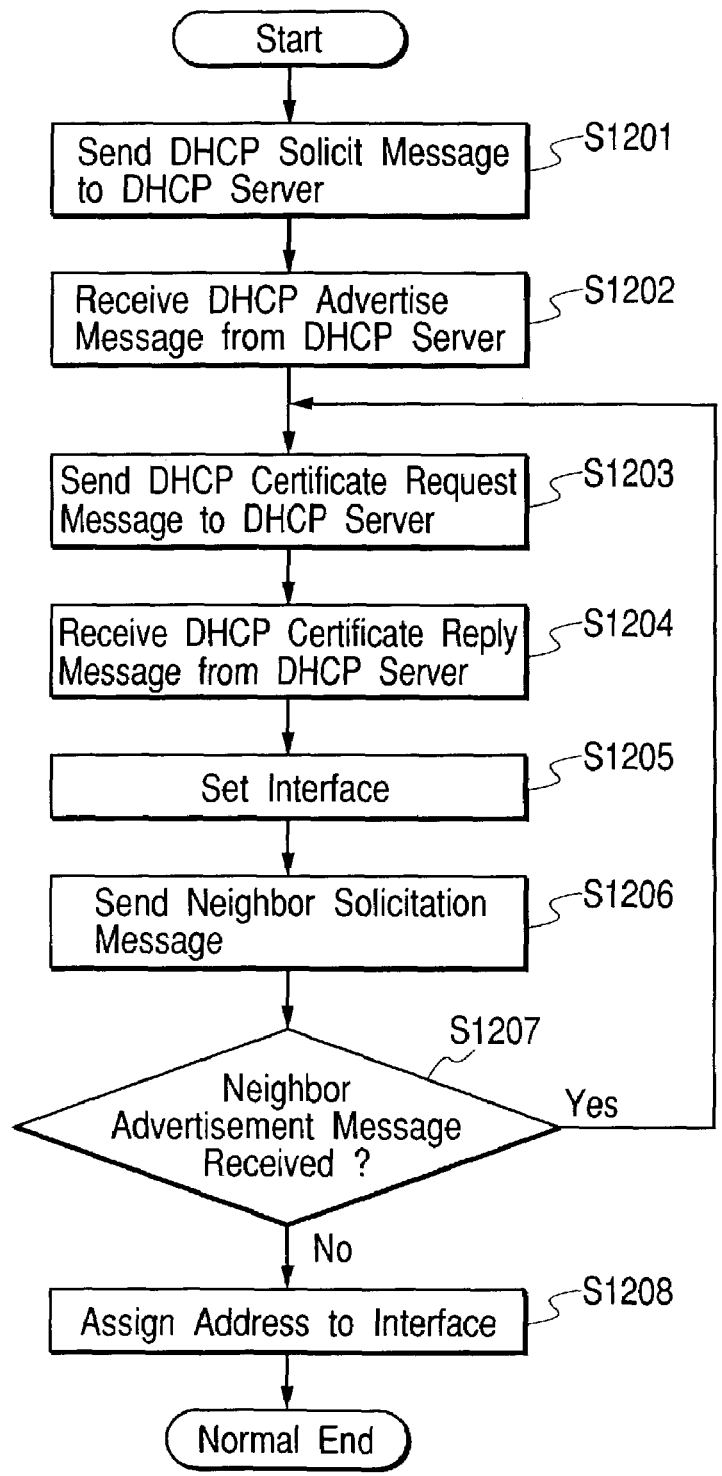
FIG. 12 is a flow chart showing operations until the host receives an address and an anonymous public key certificate by DHCP.

In such case, in a step S1106 in FIG. 11, the host executes an extended protocol for stateful address autoconfiguration, namely a protocol of acquiring the address and the certificate from the DHCP server. FIG. 12 shows a flow chart of the operations of such protocol.

This flow chart is different from that shown in FIG. 10 in two points, namely in steps S1203 and S1204.

In a step S1203, there is transmitted a DHCP Certificate Request Message, which includes both the DHCP Request Message transmitted in the step S1003 in FIG. 10 and data corresponding to the Certificate Solicitation transmitted in the step S102 in FIG. 1 (destination of transmission being the DHCP server 203 instead of the router 202).

Upon receiving the this message, the DHCP server 203 executes processes of S103, S103A and S104 in FIG. 1 and receives an anonymous public key certificate from the Certification Authority 209 as in the step S106. Then the DHCP server 203 sends a DHCP Certificate Reply Message, including both a DHCP Reply Message and data corresponding to the Certificate Advertisement, to the host 206.

Consequently, a DHCP Certificate Reply Message received in a step S1204 is data including both the DHCP Reply Message received in the step S1004 in FIG. 10 and data corresponding to the Certificate Advertisement received in the step S107 in FIG. 1 (transmission source being the DHCP server 203 instead of the router 202). Then it generates an IPv6 global address, assigns it to the interface 301 and confirms the legitimacy of the anonymous public key certificate. In the present case, the legitimacy of the anonymous public key certificate is confirmed, as in the step S108, by the public v_ca of the Certification Authority 209.

Through the above-described protocol, it is rendered possible to issue a one-time IPv6 address and a corresponding one-time anonymous public key certificate by simply increasing the data, without changing the number of steps in the conventional protocol.

A case where both the router 202 and the DHCP server 203 are relied on by the Certification Authority 209 functioning as the CA corresponds to a situation of receiving the Router Certificate Advertisement Message designating both stateless and stateful in a step S1104 in FIG. 11 (case "YES"), and, in such case, it is possible to apply the aforementioned two extended protocols in an arbitrary combination thereby achieving automatic setting and acquisition of the link local address, the site local address, the one-time IPv6 global address, the corresponding one-time anonymous public key certificate and the default gateway. In such case, the router 202 and the DHCP server 203 correspond to a communication apparatus group providing the host (communication apparatus) 206 with the address information for setting the address, and the router 202 and the DHCP server 203 constituting a group of such information processing apparatuses request the public key certificate to the Certification Authority 209 and transmits the public key certificate, issued by the Certification Authority, to the host 206.

In case an exclusive CA server, constituted by another IPv6 supporting apparatus which is neither the router 202 nor the DHCP server 203, is relied on by the public key certificate issuer 209, and the exclusive CA server and the public key certificate issuer 209 cooperate to issue a public key certificate to a host, and in case such exclusive CA server and the target host are present in a same local link 207, the public key certificate can be issued by a process similar to that of the router 202 shown in FIG. 1.

In the configuration shown in FIG. 2, in case the target host is the host 206 and the exclusive CA server is the host 204, the operations therebetween are similar to those in FIG. 1. It is however required that the exclusive CA server know a correct IPv6 prefix assigned to the subnet, which is the link 207 in case of FIG. 2. It is therefore required that the exclusive CA server is managed by an administrator having a responsibility similar to that of the administrator of the router 202, and that an agreement is made between the Certification Authority 209 and the administrator on the measure for example in case of a trouble, as in the case of the router 202.

The host 206 transmits the Router Certificate Solicitation message in S1101 in FIG. 11 (Certificate Solicitation message for requesting the anonymous public key certificate of S101 in FIG. 1) from the interface 301 to the link 207 for every communication counterpart, for every session or for every transmission of a communication packet, thus receiving the anonymous public key certificate from the Certification Authority 209. Thus the host 206 realizes the privacy protection by requesting and receiving a new public certificate whenever necessary, and also prevents disguising by sending a public key certificate including the IPv6 address to the communication counterpart. The public keys (g', v_i') belong to a same entity but are changed with the lapse of time.

In the foregoing, there has been explained an embodiment in which the router 202 or the DHCP server 203 provides the host 206 with the prefix of the IPv6 address, but an embodiment of providing the IPv6 address itself can also be realized by a same protocol except that the address is transmitted instead of the prefix and that the process of address generation by the host can be dispensed with.

Second Embodiment

In the first embodiment, the default gateway (router), after authentication of the host, cooperates with the Certification Authority to send the Certificate Advertisement including the anonymous public key certificate and the prefix to the host. In the present embodiment, there will be explained a case in which the sending of the prefix and the issuance of the anonymous public key certificate are independent.

As in the first embodiment, the Certification Authority 209 becomes the entity CA, while the host 206 (or the user thereof) becomes the entity i utilizing the anonymous public key certificate. However, the Certification Authority 209 does not have all the functions of the CA in the aforementioned anonymous public key certificate system. In the following, there will be explained a case where the IPv6 supporting apparatus, which is located in a local link 207 of an IPv6 supporting apparatus (host 206) utilizing the public key certificate, and which is relied on by the public key certificate issuer (CA, namely Certification Authority 209), is the default gateway 202. Stated differently, there will be explained a case where a part of the functions of the entity CA in the anonymous public key certificate system is owned by the default gateway 202 instead of the Certification Authority 209.

Also the IPv6 supporting apparatus relied on by the Certification Authority 209 can be a DHCP server or an exclusive CA server. In the following there will be explained an architecture where a random IPv6 address is included in the certificate, but there can also be conceived an architecture in which the random IPv6 address is not included in the certificate. As explained in the foregoing, the default gateway 202 will be hereinafter called a router 202. In the present embodiment, the default gateway 202 provides the host 206 with the prefix of the IPv6 global address.

It is also assumed in this case that the Certification Authority 209 and the default gateway 202 (or DHCP server or exclusive CA server) can execute a secure and reliable communication through the internet, for example by securely exchanging public key cryptosystems or securely sharing a secret encrypting key.

The administrator of the Certification Authority 209 determines a public key v_ca for the CA.

The administrator of the router 202 determines and discloses the aforementioned public parameters p, g etc. Also it determines the public key v_router for the router.

When a user i applies for an access to the LAN, the user generates its own secret key s_i utilizing the public parameters p, g etc., calculates a corresponding public key v_i and submits the user name, the password and the public key v_i to the administrator of LAN (administrator of the router 202). The administrator of LAN (administrator of the router 202), after executing an identification of the user i and a password check according to its operating policy, permits an access. The administrator makes a registration in the RAM 304 or the HD 306 in such a manner that the corresponding public key can be retrieved from the entity name. The public parameters p, g etc. and the public key v_i, and particularly the secret key s_i are managed by the user i and are made securely usable in the host 206.

Figure 15:
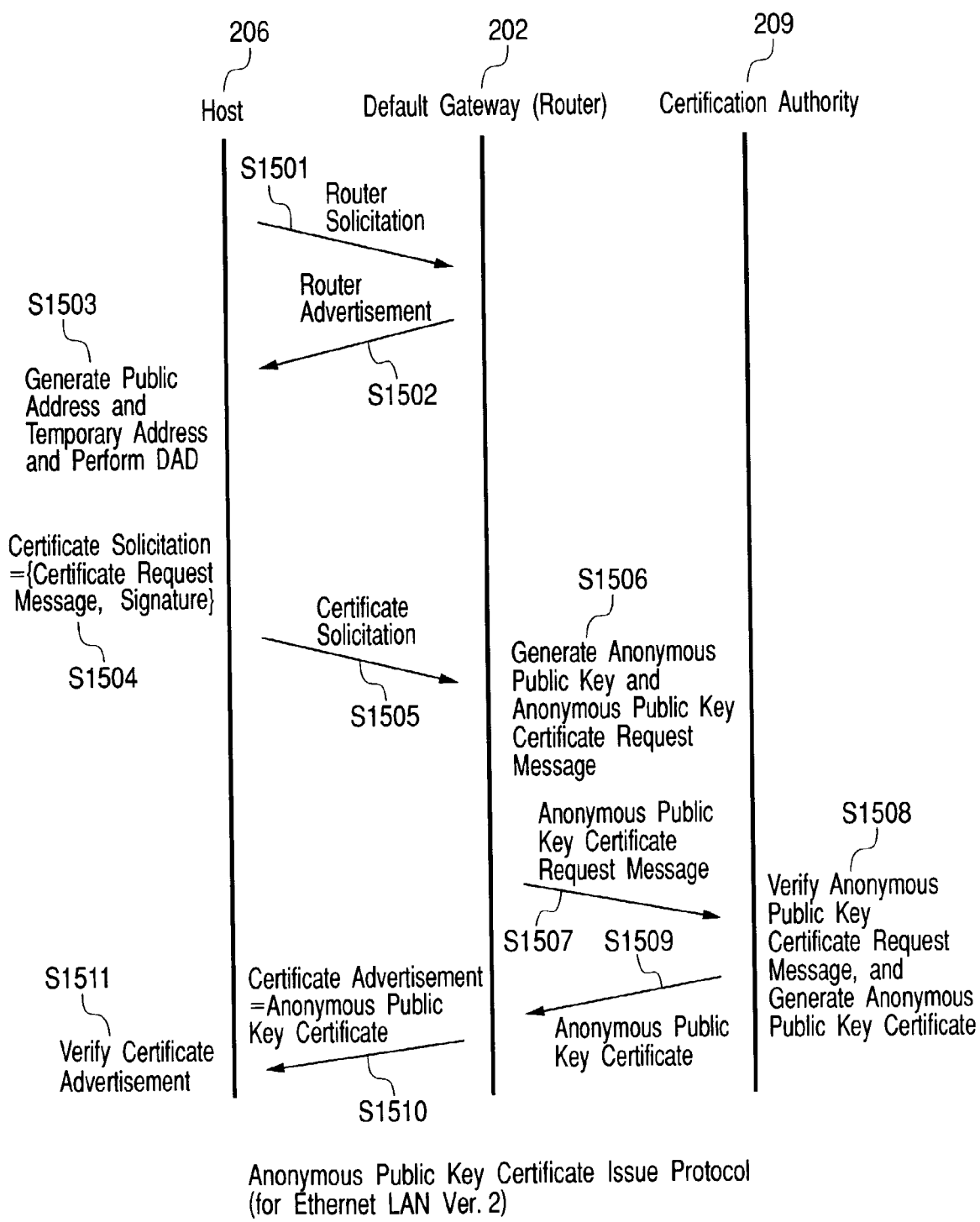
FIG. 15 is a view showing a protocol for issuing an anonymous public key certificate (for Ethernet® LAN) in a second embodiment.

FIG. 15 shows a protocol of the present embodiment, which is executed after the aforementioned preparations. FIG. 15 shows an issuing protocol for an anonymous public key certificate among an entity utilizing the anonymous public key certificate (IPv6 terminal utilized by the user i) and constituted by the host 206, an IPv6 terminal providing the prefix and constituted by the default gateway 202, and an entity CA issuing the anonymous public key certificate and constituted by the Certification Authority 209.

Since it is necessary to specify the entity in order to issue the anonymous public key certificate, there is executed a specifying (authentication) protocol between the router 202 and the entity (host 206 in this case). In the present embodiment, there will be adopted a system based on a public key cryptography as will be explained in the following. The operations will be explained according to a flow in FIG. 15.

The host 206, after being powered or re-booted, generates an interface ID from a MAC address of the network interface (301 in FIG. 3). Also the host 206 generates a random interface ID by an algorithm for example of RFC 3041. Then, it generates a link local address by attaching the interface ID generated from the MAC address to a predetermined prefix, executes DAD, and sends a Router Solicitation (RS) to the router (step S1501). The RS is multicast to all the routers on the link, as explained before.

Upon receiving the RS, the router 202 sends a Router Advertisement (RA) (step S1502).

Upon receiving the RA, the host 206 extracts the prefix contained in the RA and generates a global address (called public address) from the interface ID generated from the MAC address and the extracted prefix. It also generates a one-time IPv6 address (called temporary address) from a random interface ID and the extracted prefix. It then executes a DAD (duplicate address detection) for detecting duplication of the public address and the temporary address, thereby confirming the uniqueness of the addresses in the link, and assigns these addresses to the interface (step S1503).

Then the host 206 generates a Certificate Solicitation (step S1504). The Certificate Solicitation is a message requesting an anonymous public key certificate and is generated in such a format understandable to the router 202 that the host 206 requests an anonymous public key certificate. Such format is defined for example by PKCS #10 in RFC 2986 "PKCS #10: Certification Request Syntax Specification Version 1.7", or by RFC 2511 "Internet X.509 Certificate Request Message Format". Though the details of the format are not explained, but the Certificate Solicitation is assumed to be constituted by a certificate requesting message and a signature (of host) therefor. The certificate request message includes the temporary address.

Then the host 206 sends the Certificate Solicitation to the router 202 through the link 207 (step S1505). Unicasting is possible because the host 206 at this point knows the (unicast) address of the router 202.

The router 202 retrieves the public key v_i from the RAM 305 or the HD 306 based on the entity name (identifier of the host 206 or the name of the user utilizing the host 206) contained in the Certificate Solicitation received in the step S1505, and confirms the legitimacy of the signature utilizing such public key. After the confirmation, there is prepared an anonymous public key of the host 206. More specifically, the aforementioned g', v_i', p and q are anonymous public keys. Then an anonymous public key certificate requesting message is generated in order to cause the Certification Authority 209 to issue a certificate for the anonymous public keys (step S1506).

Then the router 202 sends an anonymous public key certificate requesting message to the Certification Authority 209 (step S1507). The anonymous public key certificate requesting message has a format similar to that of the aforementioned certificate requesting message, and is assumed to be data constituted by an anonymous public key certificate requesting message and a signature of the router thereto. This anonymous public key certificate requesting message includes the temporary address of the host 206.

Having received the anonymous public key certificate from the router 202, the Certification Authority 209 confirms whether it is legitimate data prepared in the router 202. For example, in case of reception by the aforementioned secure and reliable communication, the fact of such reception itself may prove that the data are generated in the legitimate router 202. Otherwise, in case of a digital signature based on a public key cryptography, the confirmation may be made by the public key v_router of the router.

In any case, having confirmed the legitimacy of the anonymous public key certificate requesting message, the Certification Authority 209 generates a digital signature for a message (namely Hash value) formed by adding, to the anonymous public keys (g', v_i', p, q) and the temporary address contained in the certificate requesting message, management/attribution X relating thereto, and generates an anonymous public key certificate constituted by such message and the signature. In a variation of the present invention, the anonymous public key certificate includes the public key of the Certification Authority 209.

Then the Certification Authority 209 sends the anonymous public key certificate to the router 202 (step S1509). In an architecture of the present invention, this anonymous public key certificate is transmitted under encryption with the registered public key.

The router 202 sends a Certificate Advertisement including the anonymous public key certificate to the host 206 (step S1510). In an architecture of the present invention, the Certificate Advertisement is transmitted under encryption with the registered public key. In this operation, it may send as a unicast to the temporary address from the Certification Authority 209 directly to the host 206.

Based on the received Certificate Advertisement, the host 206 confirms the legitimacy of the anonymous public key certificate (step S1511).

Figure 16:
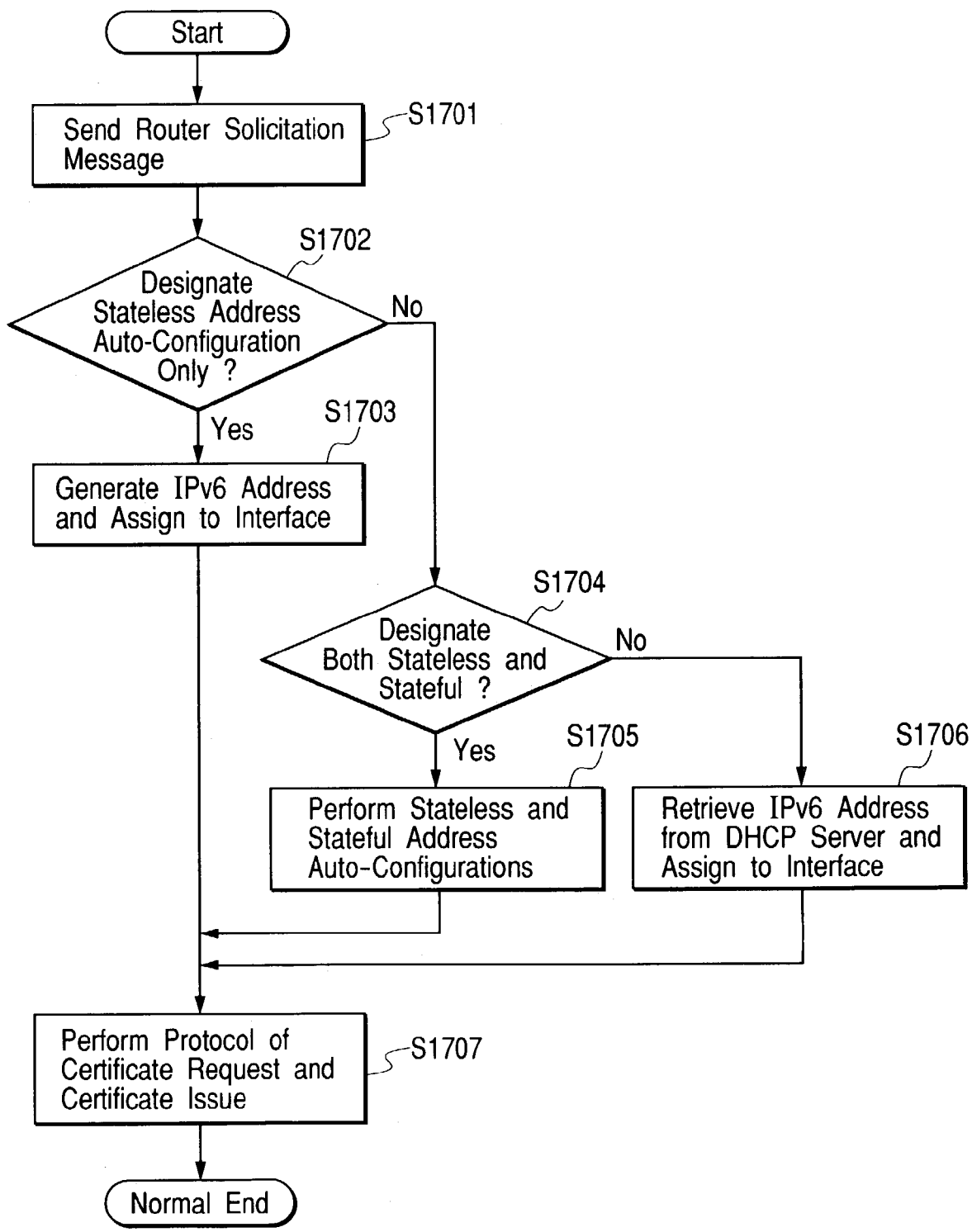
FIG. 16 is a flow chart showing operation until the user retrieves a certificate.

FIG. 16 shows a flow chart showing the host operation in an extended protocol in which the above-described protocol is combined with already known stateless address autoconfiguration and stateful address autoconfiguration.

The host 206, after being powered or re-booted, generates an interface ID from a MAC address of the network interface (301 in FIG. 3). Also the host 206 generates a random interface ID by an algorithm for example of RFC 3041. Then, it generates a link local address by attaching the interface ID generated from the MAC address to a predetermined prefix, executes DAD, and sends a Router Solicitation (RS) to the router (step S1701). The RS is multicast to all the routers on the link, as explained before.

In case of receiving the Router Advertisement Message (RA) designating the stateless address autoconfiguration only, namely in a case "YES" in a step S1702, the host 206 extracts the prefix contained in the RA and generates a global address (called public address) from the interface ID generated from the MAC address and the extracted prefix. It also generates a one-time IPv6 address (called temporary address) from a random interface ID and the extracted prefix. It then executes a DAD (duplicate address detection) for detecting duplication of the public address and the temporary address, thereby confirming the uniqueness of the address in the link, and assigns these addresses to the interface (step S1703).

Then the host 206 executes a protocol for requesting and issuing the certificate (step S1707). More specifically, the host 206 generates the Certificate Solicitation as in the steps S1504, S1505 in FIG. 15, and sends it to the router 202. The host 206 receives the Certificate Advertisement from the router 202 and confirms the legitimacy of the anonymous public key certificate contained therein. In case no Router Advertisement is received (corresponding to a case "NO" in a step S1704), there is only executed the stateful address autoconfiguration, namely DHCPv6. This operation corresponds to a step S1706, of which details are same as in the protocol shown in FIG. 10.

In case the step S1704 receives a Router Advertisement message designating both the stateless address autoconfiguration and the stateful address autoconfiguration, a step S1705 executes both the stateless address autoconfiguration and the stateful address autoconfiguration. The content of the process is same as that of the steps S1703 and S1706.

Third Embodiment

This embodiment shows a case where a host is connected to the internet by a dial-up method or by ADSL. At first there will be explained a current situation, and the present embodiment will be explained later.

Figure 14:
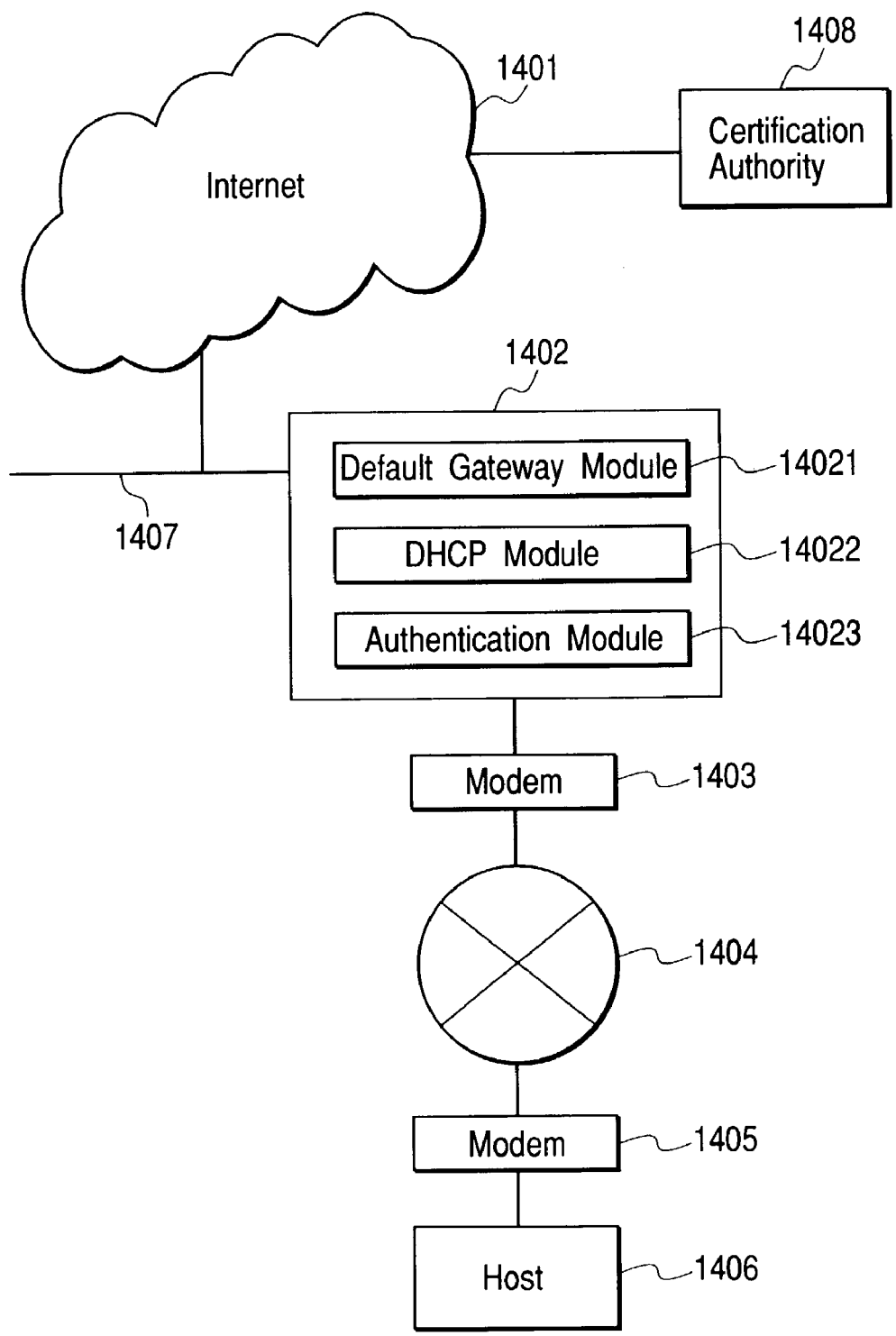
FIG. 14 is a block diagram of a dial-up/ADSL connection.

FIG. 14 schematically shows a connection environment in which the present invention is applicable. FIG. 14 shows an environment in which a host 1406 accesses to an internet 1401 provided by an ISP (Internet Service Provider) through a PSTN (Public Switched Telephone Network). In the present embodiment, the ISP and the host are connected by a PPP link.

In FIG. 14, a PPP peer 1402 of the ISP is a node, which accepts a request for PPP connection from the host 1406, utilizing a modem 1403 and through the PSTN 1404. The PPP peer 1402 has functions as a default gateway module 14021, a DHCP module 14022 and an authentication module 14023. The host 1406 accesses to the PPP peer 1402 by a PPP connection utilizing a modem 1405. The host 1406 has an architecture similar to that shown in FIG. 3, and is connected to the modem 1405 through the network interface 301. Also the PPP peer 1402 has an architecture similar to that shown in FIG. 3, and is connected to the modem 1403 through the network interface 301 and to the link 1407 (and the internet 1401) through a network interface 302. The PPP peer 1402 is an address information providing apparatus for providing the host 1406 (communication apparatus) with address information for setting the address.

In the present embodiment, there will be explained a configuration employing a modem and a PSTN as an example, but, the situation is basically same in other forms of communication such as a TA (terminal adaptor) and an ISDN (integrated services digital network), a PHS communication adaptor and a PHS communication network, or an exclusive line connecting apparatus and an exclusive line, as long as the PPP connection can be established. The details of the PPP connection are described in RFC 1661 "The point-to-point Protocol (PPP)".

The host 1406 transmits a request for PPP connection to the PPP peer 1402 through a modem 1405, a PSTN 1404 and a modem 1403. In response to such connection request, the authentication module 14023 of the PPP peer 1402 executes an authentication of the host. A typical authentication process is an authentication protocol CHAP based on the user name and the password, of which details are described in RFC 1994 "PPP Challenge Handshake Authentication Process".

After the authentication, the DHCP module 14022 transmits, according to the setting, the prefix of the IPv6 global address and the IPv6 address of the default gateway to the host 1406. The DHCP module 14022 is set by the administrator of the ISP according to the operating policy thereof.

In FIG. 14, for the purpose of simplicity, the default gateway, the DHCP server and the authentication server are assumed to be present respectively as the default gateway module 14021, the DHCP module 14022 and the authentication module 14023 provided in the PPP peer, but they may in fact be present as respectively different nodes on the link 1407. In fact any form is acceptable as long as such module or node is securely operated under the management by the administrator, that a PPP link is established between the host 1406 and the PPP peer 1402 in the configuration shown in FIG. 14.

The host 1406, after receiving the IPv6 global address (or the prefix thereof), the IPv6 address of the default gateway etc. from the DHCP module 14022, generates a random IPv6 global address by combining the prefix of the IPv6 global address and an own random interface ID (generated for example according to RFC 3041), then, after confirming the absence of duplication thereof on the link, assigns it to the interface 301 and memorizes the IPv6 address of the default gateway.

Through the foregoing operations, the host 1406 can communicate with an arbitrary counterpart in the internet, using the one-time IPv6 address.

In the following there will be explained an embodiment of the present invention, in which the aforementioned operations (protocol) are extended to provide a protocol enabling the use of a one-time anonymous public key certificate.

In the following, there will be explained a case of applying the anonymous public key certification to an environment shown in FIG. 14. The Certification Authority 1408 functions as the CA, while the host 1406 (or the user thereof) functions as the entity i utilizing the anonymous public key certificate. In the following there will be explained an embodiment of including a random IPv6 address in the certificate, but it is also possible not to include such random IPv6 address.

The Certification Authority 1408 determines and discloses the aforementioned public parameters p, g etc., and its secret key $s\_ca$ and a public key $v\_ca$. It is assumed that the Certification Authority 1408 relies on the PPP peer 1402. More specifically, it is assumed that an agreement is made with the management person or organization of the PPP peer 1402, namely with the ISP on the responsibility in case of a trouble, and that a secure and reliable communication can therefore be executed between the Certification Authority 1408 and the PPP peer 1402.

When a user i applies for an entry in the ISP, the user generates its own secret key $s\_i$ utilizing the parameters p, g etc. disclosed by the Certification Authority 1408, calculates a corresponding public key $v\_i$ and submits the user name, the password and the public key $v\_i$ to the ISP. The administrator of ISP (administrator of PPP peer 1402), after executing an identification of the user i and a password check according to its operating policy, permits an access. The manager makes a registration in the RAM 304 or the HD 306 in such a manner that the corresponding public key can be retrieved from the user name. The public parameters, and the public key $v\_i$, and particularly the secret key $s\_i$ are managed by the user i and are made securely usable in the host 1406.

Figure 13:
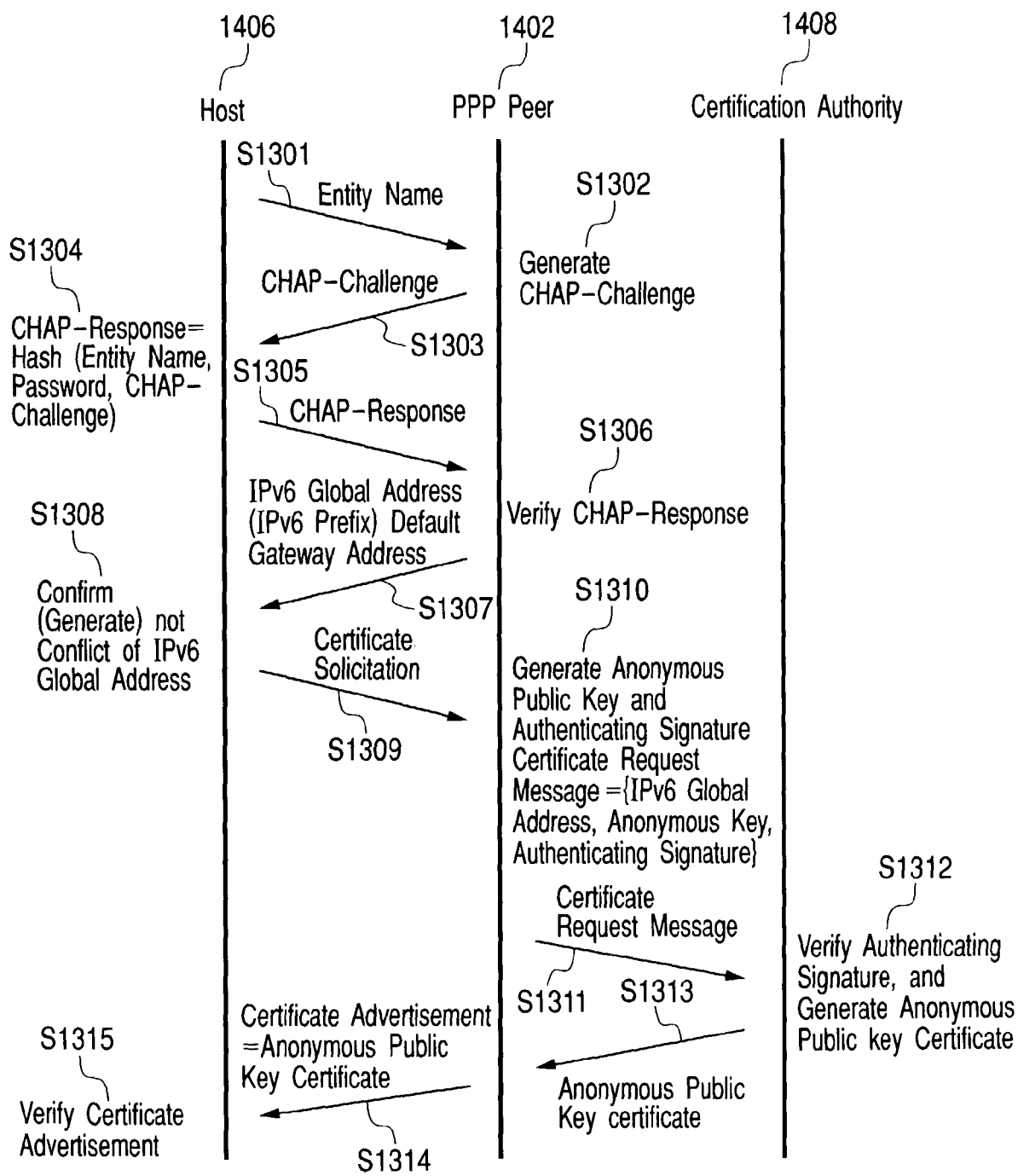
FIG. 13 is a view showing a protocol for issuing an anonymous public key certificate (for PPP) in a third embodiment.

FIG. 13 shows a protocol of the present embodiment, which is executed after the aforementioned preparations. FIG. 13 shows an issuing protocol for an anonymous public key certificate between an entity (IPv6 apparatus employed by the user i) constituted by the host 1406 and an entity CA constituted by the Certification Authority 1408, which relies on the PPP peer 1402.

In establishing a PPP connection, after a process in the data link layer is finished, there is executed an authentication by an authenticating protocol CHAP based on the aforementioned user name and password.

More specifically, in a step S1301, the host 1406 sends the entity name (user name) from the interface 301 to the PPP peer 1402. Upon receiving the entity name (identifier) from the interface 301 in a step S1302, the PPP peer 1402 generates a CHAP-challenge, and sends it to the host 1406 from the interface 301 in a step S1303.

In a step S1304, receiving the CHAP-challenge from the interface 301, the host 1406 enters the entity name, the password and the CHAP-challenge into the Hash function to determine a CHAP-response, and, in a step S1305, sends a value of the determined CHAP-response to the PPP peer 1402 from the interface 301.

In a step S1306, the PPP peer 1402 receives the CHAP-response from the interface 301 and confirms the legitimacy of the CHAP-response. After the successful authentication by the confirmation, the IPv6 global address (or the prefix thereof) and the address of the default gateway are transmitted to the authenticated host 1406 in a step S1307.

In a step S1308, the host 1406 generates IPv6 global address by combining the IPv6 global address (or the prefix thereof) and a random interface ID, then, after confirming the absence of duplication thereof, assigns it to the network interface 301 and also memorizes the address of the default gateway. Then, in a step S1309, it sends a Certificate Solicitation as a message requesting an anonymous public key certificate to the PPP peer 1402 from the interface 301.

As in the first embodiment, the Certificate Solicitation is generated in such a format understandable to the PPP peer 1402 that it requests an anonymous public key certificate and that it contains the interface ID. The content is calculated from the entity name (user name), the password and a serial number, and the serial number is, for example, formed by concatenating an IPv6 link local address of the host 1406, an IPv6 link local address of the default gateway and a current time. The Certificate Solicitation contains a digital signature (authenticating signature) generated by entering the entity name (user name), the password and the serial number into the Hash function.

In a step S1310, the PPP peer 1402, upon receiving the Certificate Solicitation from the interface 301, retrieves the registered public key $v\_i$ from the RAM 305 or the HD 306 based on the corresponding entity name (user name of the communication apparatus (host) 1406), then generates a random number r for generating an anonymous public keys (g' and $v\_i'$) ($=(g^r \mod p, (v\_i)^{(r)} \mod p)$) as explained in the foregoing, and generates an authenticating signature for the IPv6 global address of the host 1406 and the anonymous public keys (g', $v\_i'$). Then, in a step S1311, a certificate requesting message constituted by the IPv6 global address of the host 1406, the anonymous public keys (g', v_i') and the authenticating signature is sent to the Certification Authority 1408 from the network interface 302.

In case of reception by the aforementioned secure and reliable communication, the fact of the reception itself of the data from the PPP peer 1402 by the Certification Authority 1408 may prove that the data are generated in the legitimate PPP peer 1402. Otherwise, the proof may be made by a digital signature based on a public key encryption.

In any case, having confirmed the legitimacy of the authenticating signature in a step S1312, as in the step S105 in FIG. 1, the Certification Authority 1408 generates a digital signature Sig_ca(g', v_i', X) for the IPv6 global address of the host 1406, the anonymous public keys (g', v_i') and the management/attribute information X, and generates an anonymous public key certificate constituted by the IPv6 global address of the host 1406, the anonymous public keys (g', v_i'), the management/attribute information X and the digital signature therefor. Then, in a step S1313, the Certification Authority 1408 sends such anonymous public key certificate from the network interface 301 to the PPP peer 1402. The management/attribute information X includes a validity period of the anonymous public key certificate.

The PPP peer 1402 receives the certificate from the network interface 302, and, in a step S1314, sends a Certificate Advertisement, which is the anonymous public key certificate, from the interface 301 to the host 1406. In a step S1315, the host 1406 confirms the legitimacy of the anonymous public key certificate received from the network interface 301.

The host 1406, utilizing the public key v_ca of the Certification Authority 1408, confirms the legitimacy of the anonymous public key certificate APC_ca(i)=(g', v_i', X, Sig_ ca(g', v_i', X)), namely a legitimate correspondence between (g', v_i') and Sig_ca(g', v_i', X). For example, the host 1406 extracts (g', v_i', X) from the anonymous public key certificate APC_ca(i) and calculates a Hash value thereof (for example H(g'|v_i'|X), wherein "|" indicates an association), thereby confirming whether Sig_ca(g', v_i', X) is a correct digital signature for the Hash value, utilizing the public key v_ca. The host 1406 memorizes the public key v_ca of the Certification Authority 1408 in advance. In an architecture where the public key certificate of the public key v_ca is included in the management/attribute information X of the anonymous public key certificate, the host 1406 at first confirms that the memorized public key v_ca coincides with the public key v_ca of the public key certificate, included in the management/attribute information X of the anonymous public key certificate, and then confirms the legitimacy of the anonymous public key certificate utilizing such public key v_ca.

In the foregoing protocol, the data sent and received in the steps S1305 and S1309 may be collectively sent in the step S1305. In such case, though not illustrated, the host 1406 sends the random interface ID, the CHAP-response and the Certificate Solicitation (similar to that in the first embodiment) to the PPP peer 1402 in a step S1305'.

Then, in a step S1306', the PPP peer 1402 confirms the legitimacy of the CHAP-response, retrieves the registered public key v_i, generates data including an IPv6 global address to be assigned to the host 1406 (from the IPv6 prefix and the interface ID) and its lifetime (validity period of use, for example 24 hours), and generates an authenticating signature and a certificate request message, which are sent, in a step S1307', to the Certification Authority 1408.

In a step S1308', the Certification Authority 1308 executes a process similar to the step S1312, and sends the anonymous public key certificate to the PPP Peer 1402 in a step S1309'. In a step S1310', the PPP peer 1402 sends a Certificate Advertisement to the host 1406. In a step S1311', the host 1406 confirms the legitimacy of the received anonymous public key certificate.

The host 1406 executes the procedure shown in FIG. 13 for every communication counterpart, for every session or for every transmission of a communication packet, thus receiving the anonymous public key certificate from the Certification Authority 1408. Thus the host 1406 realizes the privacy protection by requesting and receiving a new public certificate whenever necessary, and also prevents impersonation by sending a public key certificate including the IPv6 address to the communication counterparet. The public keys (g', v_i') belong to a same entity but are changed with the lapse of time.

In the foregoing, there has been explained an embodiment in which the PPP peer 1402 provides the host 206 with the prefix of the IPv6 address, and the host 1406 generates the IPv6 address from the IPv6 prefix and the interface ID, but an embodiment, in which the PPP peer 1402 transmits the IPv6 address to the host 1406 and the host 1406 utilizes such address, can also be realized by a similar protocol. In such case, the protocol can be same except that the IPv6 address is transmitted instead of the prefix in the step S1307 shown in FIG. 3 and that the process of address generation from the prefix in the step S1308 can be dispensed with.

Fourth Embodiment

Now there will be explained an embodiment of executing an Ipsec communication, utilizing the one-time IPv6 address and the one-time anonymous public key certificate issued in the first, second or third embodiment.

At first there will be given a brief explanation on an authentication method by a revised mode of public key encryption in IKE (Internet Key Exchange), which is a protocol for securely sharing SA (Security Association) constituted by secret data, mutual IPv6 addresses etc., and there will then be explained a method utilizing the anonymous public key certificate.

The IKE is formed by two phases, namely a phase 1 for establishing a secure communication path, and a phase 2 for agreeing to SAs to be used in the communication such as IPsec communication, utilizing such secure communication path. In the following the phase 1 only will be explained. The IKE phase 1 includes a Main mode and an Aggressive mode, and there will be explained, in the following, the Main mode according to RFC 2409 "The Internet Key Exchange (IKE)", pp.13-15, 5.3, Phase 1 Authenticated with a Revised mode of Public Key Encryption.

In the IKE, two communicating entities are called an Initiator and a Responder. The Initiator starts the communication. At first, the Initiator sends plural SAs (data such as secret data and mutual IPv6 addresses) to the Responder, which sends an SA, judged appropriate for use, to the Initiator whereby the SA for the phase 1 is determined.

The Initiator generates a random number (called Nonce), and sends data, obtained by encryption with the public key of the Responder, to the Responder. The Responder generates a random number and sends data, obtained by encryption with the public key of the Initiator, to the Initiator. In this manner the respectively generated Nonces can be shared, and an encryption key to be used in another communication is generated from the shared Nonces. The details are described in RFC 2409 "The Internet Key Exchange (IKE)". As will be understood from the foregoing, it is necessary to know the public key of the communication counterpart prior to the IPsec communication.

Now, let us consider a situation where a user 206 (FIG. 2) or 1406 (FIG. 14) accesses to a site on the Internet 201 (FIG. 2) or 1401 (FIG. 14), such as a shopping site (not shown). The site has an architecture similar to that shown in FIG. 3, and is connected to the internet 201, 1401 by the interface 301. The host 206, 1406 obtains an IPv6 address and a public key certificate including the public key through the aforementioned protocol, prior to the start of a communication with a site such as the aforementioned shopping site. In this configuration, a protocol for exchanging, renewing and changing the key based on the aforementioned public key certificate is executed to achieve an encryption/authentication communication.

In this state, the user knows the IPv6 address of the shopping site (whether explicitly or implicitly). After making an actual access and finding that it is a proper site for the user, the user confirms the IPv6 address of the communication counterpart, thereby explicitly knowing the address. Also the shopping site can know the address of the communication counterpart, in the course of communication. The above-mentioned communication can be executed with a one-time IPv6 address.

In the present embodiment, when the transmitter and the receiver are established, the one-time IPv6 address is not renewed but used in continuation. At this point, the site and the user 206, 1406 mutually send the one-time anonymous public key certificates APC_ca(i). Since X in the one-time anonymous public key certificate APC_ca(i) includes the IPv6 global address, each party confirms whether such IPv6 address coincides with the IPv6 address of the counterpart in the actual communication. Also each party confirms the legitimacy of the anonymous public key certificate, to judge whether such certificate is a true one-time anonymous public key certificate of the communication counterpart and to confirm whether the public key contained therein is the true public key of the communication counterpart.

More specifically, the user 206, 1406 sends the one-time anonymous public key certificate from the interface 301 to the site. The site connected to the internet 201, 1401 confirms whether the IPv6 address, included in the one-time anonymous public key certificate APC_ca(i) received from the user 206, 1406 through the interface 301, coincides with the IPv6 address of the user 206, 1406. Further, the site confirms the legitimacy of the one-time anonymous public key certificate APC_ca(i), utilizing the public key v_ca of the Certification Authority 209, 1408. Similarly, the user 206, 1406 confirms whether the IPv6 address, included in the received one-time anonymous public key certificate APC_ca(i) coincides with the IPv6 address of the site, and the legitimacy of the public key certificate, utilizing the public key v_ca of the Certification Authority 209, 1408.

The legitimacy of the one-time anonymous public key certificate can be confirmed in the following manner. The host 206, 1406 confirms the legitimacy of the one-time anonymous public key certificate APC_ca(i)=(g', v_i', X, Sig_ca(g', v_i', X)), namely the correct correspondence of (g', v_i') and Sig_ca(g', v_i', X), utilizing the public key v_ca of CA (such as the VeriSign or the like providing the commercial authentication service) 209 (FIG. 2), 1408 (FIG. 14). For example, the host 206, 1406 extracts (g', v_i', X) from the anonymous public key certificate APC_ca(i) and calculates a Hash value thereof (for example H(g'|v_i'|X), wherein "|" indicates concatenation), thereby confirming whether Sig_ca(g', v_i', X) is a correct digital signature for the Hash value, utilizing the public key v_ca. The host 206, 1406 memorizes the widely known public key v_ca of the CA (such as the VeriSign or the like providing the commercial authentication service) 209 (FIG. 2), 1408 (FIG. 14) in advance. In an architecture where the public key certificate of the public key v_ca is included in the management/attribute information X of the anonymous public key certificate, the host 206, 1406 at first confirms that the memorized public key v_ca coincides with the public key v_ca of the public key certificate, included in the management/attribute information X of the anonymous public key certificate, and then confirms the legitimacy of the anonymous public key certificate utilizing such public key v_ca.

The host 206 or 1406 executes the protocol shown in FIG. 11 or 13 for every communication counterpart (namely for every new connection to a site), or every session, thereby renewing or changing the IPv6 address and the public keys g' and v_i' to be used. The public keys g' and v_i' may be renewed or changed for every transmission of a communication packet. Thus the host 1406 realizes the privacy protection by requesting and receiving a new public certificate whenever necessary, and also prevents impersonation by sending a public key certificate including the IPv6 address to the communication counterparet.

Through the foregoing protocol, it is rendered possible to securely obtain the public key of the communication counterpart defined by the IPv6 address, utilizing the one-time IPv6 address and the one-time anonymous public key certificate including the same. Also by executing the Main mode of the phase 1 of the aforementioned IKE with thus exchanged public keys, there can be realized an IPsec communication with a communication counterpart having such IPv6 address.

More specifically, the aforementioned site, after confirming that the one-time anonymous public key certificate received from the user 206, 1406 is a legitimate one-time anonymous public key certificate, executes the Main mode of the phase 1 of the aforementioned IKE by the interface 301 utilizing the public keys (g', v_i') of such one-time anonymous public key certificate, thereby executing an IPsec communication with the user 206, 1406 having such IPv6 address. Also the user 206, 1406 executes the Main mode of the phase 1 of the aforementioned IKE by the interface 301, thereby executing an IPsec communication with the site having such IPv6 address.

Consequently it is possible to prevent the impersonation of the communication counterpart as mentioned in the drawback of the known technology.

In the foregoing, the present invention has been explained by preferred embodiments thereof, but the present invention is not limited to such embodiments and is subjected to various modifications within the scope and spirit of the appended claims.

What is claimed is:

1. An anonymous public key generating apparatus comprising:
   communication means for communicating with a communication apparatus through a network;
   generation means for generating an anonymous public key based on public information related to a secret key of the communication apparatus; and
   transmission means which transmits a signal including a global address prefix to be used by the communication apparatus and transmits, in response to a first request for a public key certificate from the communication apparatus, a second request including the anonymous public key generated by said generation means and the global address prefix of the communication apparatus to a public key certificate issuer for requesting a public key certificate of the generated anonymous public key, wherein the anonymous public key is generated so that the communication apparatus may use the anonymous public key with the secret key of the communication apparatus.

2. An apparatus according to claim 1, wherein said communication means transmits a public key certificate issued by the public key certificate issuer to the communication apparatus.

3. An apparatus according to claim 1, wherein said transmission means transmits a second public key, generated by said generation means according to the first public key of the communication apparatus requesting the public key certificate, to the public key certificate issuer.

4. An apparatus according to claim 3, wherein said communication means, upon receiving the first request including a digital signature from the communication apparatus, confirms the legitimacy of the digital signature, utilizing the first public key of the communication apparatus.

5. An apparatus according to claim 1, wherein said transmission means transmits address information of the communication apparatus to the public key certificate issuer.

6. An apparatus according to claim 1, wherein said generating means generates the public key in accordance with a public parameter, and said transmission means transmits the generated public key to the public key certificate issuer in response to the public key certificate requesting message.

7. A computer-readable medium embodying an anonymous public key generating program, the program comprising steps of:
    transmitting a signal including a global address prefix to be used by the communication apparatus;
    generating an anonymous public key based on public information related to a secret key of the communication apparatus;
    receiving a first request for a public key certificate from a communication apparatus through a network; and
    transmitting, in response to the first request, a second request including the generated anonymous public key and the global address prefix of the communication apparatus to a public key certificate issuer for requesting a public key certificate of the generated anonymous public key,
    wherein the anonymous public key is generated so that the communication apparatus may use the anonymous public key with a the secret key of the communication apparatus.

8. A program according to claim 7, wherein said transmission step transmits a second public key, generated according to a first public key of the communication apparatus requesting the public key certificate, to the public key certificate issuer.

9. A program according to claim 8, wherein said reception step, upon receiving the first request including a digital signature from the communication apparatus, confirms the legitimacy of the digital signature, utilizing the first public key of the communication apparatus.

10. A program according to claim 7, wherein a second public key is generated in said generating step in accordance with a first public key of the communication apparatus, and the generated second public key is transmitted in said transmitting step to the public key certificate issuer in response to the public key certificate requesting message.

11. A program according to claim 7, wherein the public key is generated in accordance with a public parameter and the generated public key is transmitted in said transmitting step to the public key certificate issuer in response to the public key certificate requesting message.

12. A public key certificate issuing method comprising steps that:
    an anonymous public key generating apparatus transmits a signal including a global address prefix to be used by a communication apparatus, generates an anonymous public key based on public information related to a secret key of the communication apparatus, receives a first request for a public key certificate from the communication apparatus through a network, and transmits, in response to the first request, a second request including the generated anonymous public key and the global address prefix of the communication apparatus to a public key certificate issuer for requesting the public key certificate for the anonymous public key; and
    said public key certificate issuer issues the public key certificate for the anonymous public key received from the anonymous public key generating apparatus,
    wherein the anonymous public key is generated so that the communication apparatus may use the anonymous public key with the secret key of the communication apparatus.

13. A method according to claim 12, wherein said public key generating apparatus transmits a second public key, generated according to the first public key of the communication apparatus requesting the public key certificate, to said public key certificate issuer.

14. A method according to claim 13, wherein said public key generating apparatus, upon receiving the first request including a digital signature from the communication apparatus, confirms the legitimacy of the digital signature, utilizing the first public key of the communication apparatus.

15. A method according to claim 12, wherein the public key generating apparatus generates a second public key in accordance with a first public key of the communication apparatus and transmits the generated second public key to the public key certificate issuer in response to the public key certificate requesting message.

16. A method according to claim 12, wherein the public key generating apparatus generates the public key in accordance with a public parameter and transmits the generated public key to the public key certificate issuer in response to the public key certificate requesting message.

17. An anonymous public key generating method comprising:
    transmitting a signal including a global address prefix to be used by a communication apparatus;
    generating an anonymous public key based on public information related to a secret key of the communication apparatus;
    receiving a first request for a public key certificate from the communication apparatus through a network; and
    transmitting, in response to the first request, a second request including the generated anonymous public key and the global address prefix of the communication apparatus to a public key certificate issuer for requesting a public key certificate of the generated anonymous public key,
    wherein the anonymous public key is generated so that the communication apparatus may use the anonymous public key with a the secret key of the communication apparatus.

18. A method according to claim 17, wherein said transmission step transmits a second public key, generated according to a first public key of the communication apparatus requesting the public key certificate, to the public key certificate issuer.

19. A program according to claim 18, wherein said reception step, upon receiving the first request including a digital signature from the communication apparatus, confirms the legitimacy of the digital signature, utilizing the first public key of the communication apparatus.

20. A method according to claim 17, wherein a second public key is generated in said generating step in accordance with a first public key of the communication apparatus, and the generated second public key is transmitted in said transmitting step to the public key certificate issuer in response to the public key certificate requesting message.

21. A program according to claim 17, wherein the public key is generated in accordance with a public parameter and the generated public key is transmitted in said transmitting step to the public key certificate issuer in response to the public key certificate requesting message.

* * * * *